United States Patent
Anderson et al.

(10) Patent No.: US 10,599,425 B1
(45) Date of Patent: Mar. 24, 2020

(54) AUTOMATED DATA ACCESS OBJECT SOURCE CODE REVIEW

(71) Applicant: STATE FARM MUTUAL AUTOMOBILE INSURANCE COMPANY, Bloomington, IL (US)

(72) Inventors: Matthew Anderson, Bloomington, IL (US); Richard T. Snyder, Colfax, IL (US); Daniel George Galvin, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

(21) Appl. No.: 15/783,546

(22) Filed: Oct. 13, 2017

(51) Int. Cl.
*G06F 8/71* (2018.01)
*G06F 11/36* (2006.01)
*G06F 9/448* (2018.01)

(52) U.S. Cl.
CPC .............. *G06F 8/71* (2013.01); *G06F 9/4488* (2018.02); *G06F 11/3616* (2013.01)

(58) Field of Classification Search
CPC ........................................................ G06F 8/71
USPC .................................................. 717/120–135
See application file for complete search history.

(56) References Cited

U.S. PATENT DOCUMENTS

| 6,571,232 B1* | 5/2003 | Goldberg ............ G06F 16/9574 |
| 2005/0086285 A1* | 4/2005 | Balasubramanian ....................... G06F 9/5038 709/200 |
| 2005/0209892 A1* | 9/2005 | Miller .................... G06Q 10/00 705/4 |
| 2006/0265254 A1* | 11/2006 | Witkowski ............. G06Q 10/10 705/4 |
| 2013/0262510 A1* | 10/2013 | Smith ..................... H03M 7/30 707/770 |
| 2014/0129582 A1* | 5/2014 | Ramsay ............ G06F 16/24534 707/759 |
| 2016/0147637 A1* | 5/2016 | Bhagavan ........... G06F 11/3664 717/127 |

OTHER PUBLICATIONS

Sadalkar, Kunal, Radhesh Mohandas, and Alwyn R. Pais. "Model based hybrid approach to prevent SQL injection attacks in PHP." Security Aspects in Information Technology. Springer, Berlin, Heidelberg, 2011. pp. 3-15. (Year: 2011).*

(Continued)

*Primary Examiner* — Satish Rampuria
(74) *Attorney, Agent, or Firm* — Faegre Baker Daniels LLP

(57) ABSTRACT

A computer-implemented automated review method for data access object (DAO) source code files seeking to access a data store comprises the steps of checking the DAO source code files for a database connectivity framework usage; setting an issue flag if the DAO source code files do not include any database connectivity framework usage; checking the DAO source code files for a configuration of structured query language (SQL) components; setting the issue flag if the SQL components are not of type "SQL"; checking the DAO source code files for an injection of inputs into the SQL components; setting the issue flag if each input into the SQL components is not typed as a structured object or a single value; reviewing the status of the issue flag; issuing a halt signal if the issue flag is set; and issuing a proceed signal if the issue flag is not set.

15 Claims, 14 Drawing Sheets

(56) References Cited

OTHER PUBLICATIONS

Zhang, Yupeng, et al. "vSQL: Verifying arbitrary SQL queries over dynamic outsourced databases." Security and Privacy (SP), 2017 IEEE Symposium on. IEEE, 2017.pp. 863-880 (Year: 2017).*

Du, Fang, Sihem Amer-Yahia, and Juliana Freire. "ShreX: Managing XML documents in relational databases." Proceedings of the Thirtieth international conference on Very large data bases—vol. 30. VLDB Endowment, 2004.pp. 1297-1300 (Year: 2004).*

* cited by examiner

AUTOMATED DATA ACCESS OBJECT SOURCE CODE REVIEW

BACKGROUND OF THE INVENTION

Field of the Invention

Embodiments of the current invention relate to methods and devices for automatically reviewing data access object (DAO) source code that seeks to access a data store or database.

Description of the Related Art

Large-scale data stores, or databases, such as those maintained by an insurance provider or a financial institution, not only include a great volume of data, but are also accessed at a high frequency. An exemplary insurance provider may have anywhere from hundreds of thousands to tens of millions of customers or clients. Associated with each customer may be personal information, such as a name, a birthdate, an address, etc., and policy information, such as a homeowner's policy with coverage terms and details about the house or property being covered, or an automobile policy with coverage terms and details about the vehicle being covered. Also associated with each customer may be account information, such as payment history and the like. All of this information is stored in one or more data stores. An exemplary insurance provider may further have thousands of employees, such as agents, representatives, adjusters, accountants, and so forth. Each employee may wish to access the data stores to create new policies, update existing policies, retrieve information about policies, delete accounts, retrieve account information, or the like. In addition, some requests for access may involve hundreds of accounts, such as preparing billing information on any given day. If the insurance provider also offers online or web service for customers to directly access policy or account information, then the traffic to the data stores could increase significantly.

Access to the data stores is controlled by data store access software. The software may include deployables, which are built from source code files. Each task or type of task may require one or more deployables. For example, creating new policies may require a first one or more deployables, while updating policy data may require a second one or more deployables, and so forth. Given the volume of data to be handled and the frequency of access, each deployable must as efficient in adding, retrieving, or modifying data as possible. Typically, data store managers, database administrators (DBAs), data access developers, or other information technology (IT) personnel review the source code used to build the deployables to ensure proper operation and performance. Since new deployables, or modifications to existing deployables, may be built or updated every day, it is difficult for data store managers and IT personnel to adequately review the source code and ensure proper performance. This leads to either inefficient code being deployed or long delays in implementing properly operating deployables.

Furthermore, the deployables may be created from at least three types of source code files. A first type of source code may provide modification to the data store contents, by adding, deleting, or changing data. A second type of source code may provide an interface between the first type of source code and applications, typically business applications, that seek to access the data store. A third type of source code may provide configuration of the software components of the first and second types of source code. It is possible that each type of source code may be written by a different group of coders or programmers. Each group may specialize in the type of source code that they write, but may have little knowledge of the requirements of the other types of source code. The fact that different groups with different concerns write the data store access source code may further contribute to inconsistencies and inefficiencies in the deployables.

SUMMARY OF THE INVENTION

Embodiments of the current invention solve the above-mentioned problems and provide a distinct advance in the art of automated source code review. Specifically, embodiments of the current invention provide computer-implemented methods that may automatically review data store access source code files by checking for compliance with guidelines regarding data store modification source code. The methods may check application interface source code files which may be written in Java™. If any of the source code files do not comply with the guidelines, then deployment of the source code may be halted until issues can be examined.

In one embodiment, the current invention provides a computer-implemented automated review method for data access object (DAO) source code files seeking to access a data store. The method may broadly comprise the steps of: receiving a request to review DAO source code files seeking to access the data store; checking the DAO source code files for spring Java™ database connectivity (JDBC) usage; setting an issue flag if the DAO source code files do not include spring JDBC usage; checking the DAO source code files for a configuration of structured query language (SQL) components; setting the issue flag if the SQL components are not of type "SQL"; checking the DAO source code files for an injection of inputs into the SQL components; setting the issue flag if each input into the SQL components is not typed as a structured object or a single value; checking the DAO source code files for a data type of the inputs into the SQL components; setting the issue flag if the data type of the input from the DAO source code does not match the data type that the SQL component should receive; checking the DAO source code files data returned from the SQL components; setting the issue flag if the data received from the SQL component is not typed as a structured object or a single value; reviewing the status of the issue flag; issuing a halt signal if the issue flag is set; and issuing a proceed signal if the issue flag is not set.

In another embodiment, the current invention provides a computer-implemented automated review method for data access object (DAO) source code files seeking to access a data store. The method may broadly comprise the steps of: receiving a request to review DAO source code files seeking to access the data store; checking the DAO source code files for class level fields; setting an issue flag if any of the fields within any class are not defined as "private"; checking the DAO source code files for Java™ methods that are defined as "private"; setting the issue flag if any "private" method includes any loops that attempt to communicate outside of the method; checking the DAO source code files for spring Java™ database connectivity (JDBC) usage; setting the issue flag if the DAO source code files do not include spring JDBC usage; checking the DAO source code files for a configuration of structured query language (SQL) components; setting the issue flag if the SQL components are not of type "SQL"; checking the DAO source code files for an injection of inputs into the SQL components; setting the issue flag if each input into the SQL components is not typed as a structured object or a single value; checking the DAO source code files for a data type of the inputs into the SQL components; setting the issue flag if the data type of the input from the DAO source code does not match the data type that the SQL component should receive; checking the DAO source code files data returned from the SQL components; setting the issue flag if the data received from the SQL component is not typed as a structured object or a single value; reviewing the status of the issue flag; issuing a halt signal if the issue flag is set; and issuing a proceed signal if the issue flag is not set.

In yet another embodiment, the current invention provides a computer-implemented automated review method for data access object (DAO) source code files seeking to access a data store. The method may broadly comprise the steps of: receiving a request to review DAO source code files seeking to access the data store; checking the DAO source code files for class level fields; setting an issue flag if any of the fields within any class are not defined as "private"; checking the DAO source code files for Java™ methods that are defined as "private"; setting the issue flag if any "private" method includes any loops that attempt to communicate outside of the method or any calls to other methods; checking the DAO source code files for spring Java™ database connectivity (JDBC) usage; setting the issue flag if the DAO source code files do not include spring JDBC usage; checking the DAO source code files for a configuration of structured query language (SQL) components; setting the issue flag if the SQL components are not of type "SQL"; checking the DAO source code files for an injection of inputs into the SQL components; setting the issue flag if each input into the SQL components is not typed as a structured object or a single value; checking the DAO source code files for a data type of the inputs into the SQL components; setting the issue flag if the data type of the input from the DAO source code does not match the data type that the SQL component should receive; checking the DAO source code files data returned from the SQL components; setting the issue flag if the data received from the SQL component is not typed as a structured object or a single value; checking the DAO source code files for SQL invocations within a Java™ method; setting the issue flag if more than one SQL component is invoked per Java™ method; reviewing the status of the issue flag; issuing a halt signal if the issue flag is set; and issuing a proceed signal if the issue flag is not set.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
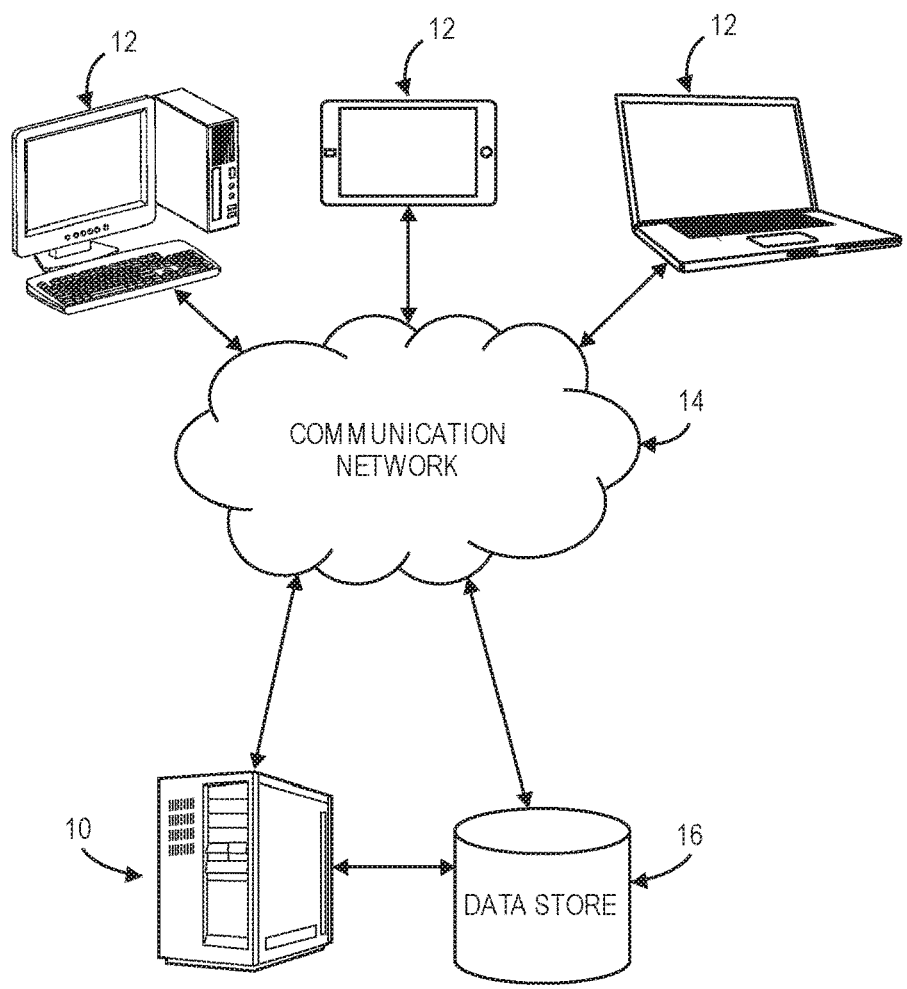
FIG. 1 is a view of an exemplary environment in which a computing device, constructed in accordance with various embodiments of the current invention, may automatically review source code files from electronic devices that seek to access a data store.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

FIG. 1 depicts an exemplary environment in which a computing device 10, constructed in accordance with various embodiments of the current invention, may be utilized for automatically reviewing data store access source code. The environment may include one or more electronic devices 12, a communication network 14, and one or more data stores 16. The electronic device 12 may be embodied by workstation computers, desktop computers, laptop computers, palmtop computers, notebook computers, tablets or tablet computers, smartphones, personal digital assistants (PDAs), other mobile devices, or the like. A user, such as a coder, developer, or programmer, may utilize an electronic device 12 to create data store access source code, which includes a plurality of text based files that access and/or operate on the data store 16. Thus, the electronic device 12 may include text editing or word processing software which allows the user to create the code. In certain embodiments, the electronic device 12 may include data store access software development packages. After the user creates the data store access source code, he may transmit the code from his electronic device 12 through the communication network 14 to the computing device 10.

The communication network 14 generally allows communication between the electronic devices 12 and the computing device 10, such as via wireless communication and data transmission over one or more radio links. The communication network 14 may include local area networks, metro area networks, wide area networks, cloud networks, the Internet, cellular networks, plain old telephone service (POTS) networks, and the like, or combinations thereof. The communication network 14 may be wired, wireless, or combinations thereof and may include components such as modems, gateways, switches, routers, hubs, access points, repeaters, towers, and the like. The electronic devices 12 may connect to the communication network 14 either through wires, such as electrical cables or fiber optic cables, or wirelessly, such as radio frequency (RF) communication using wireless standards such as cellular 2G, 3G, 4G, LTE, or 5G, Institute of Electrical and Electronics Engineers (IEEE) 802.11 standards such as WiFi, IEEE 802.16 standards such as WiMAX, Bluetooth™, or combinations thereof.

The data store 16 may be embodied by any organized collection of data and may include schemas, tables, queries, reports, and so forth which may be implemented as data types such as bibliographic, full-text, numeric, images, or the like and combinations thereof. The data store 16 may be stored in memory that resides in one computing machine, such as a server, or multiple computing machines. In some embodiments, the data store 16 may reside in the same machine as one of the electronic devices 12 or the computing device 10. In addition, the data store 16 may interface with, and be accessed through, a data store management system or a database management system (DBMS), as is commonly known. The computing device 10 may communicate with the data store through the communication network 14 or directly. In addition, electronic devices 12 may communicate with the data store 16 through the communication network 14.

Figure 2:
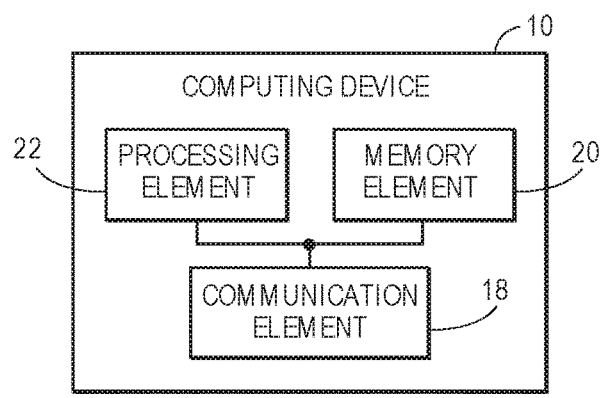
FIG. 2 is a block schematic diagram of various electronic components of the computing device.

The computing device 10 may be embodied by workstation computers, desktop computers, laptop computers, palmtop computers, notebook computers, tablets or tablet computers, application servers, data store servers, file servers, web servers, or the like, or combinations thereof. The computing device 10, as shown in FIG. 2, may broadly comprise a communication element 18, a memory element 20, and a processing element 22.

The communication element 18 generally allows the computing device 10 to send data to and receive data from the communication network 14. The communication element 18 may include signal or data transmitting and receiving circuits, such as antennas, amplifiers, filters, mixers, oscillators, digital signal processors (DSPs), and the like. The communication element 18 may establish communication wirelessly by utilizing RF signals and/or data that comply with communication standards such as cellular 2G, 3G, 4G, LTE, or 5G, IEEE 802.11 standard such as WiFi, IEEE 802.16 standard such as WiMAX, Bluetooth™, or combinations thereof. In addition, the communication element 18 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 18 may establish communication through connectors or couplers that receive metal conductor wires or cables which are compatible with networking technologies such as Ethernet. In certain embodiments, the communication element 18 may also couple with optical fiber cables. The communication element 18 may be in communication with the processing element 22 and the memory element 20.

The memory element 20 may be embodied by devices or components that store digital data and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 20 may be embedded in, or packaged in the same package as, the processing element 22. The memory element 20 may include, or may constitute, a "computer-readable medium." The memory element 20 may store the instructions, code, code segments, code statements, software, firmware, programs, applications, apps, services, daemons, or the like that are executed by the processing element 22. The memory element 20 may also store settings, data, documents, sound files, photographs, movies, images, databases, and the like.

The processing element 22 may include electronic hardware components such as processors, microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 22 may generally execute, process, or run instructions, code, code segments, code statements, software, firmware, programs, applications, apps, processes, services, daemons, or the like. The processing element 22 may also include hardware components such as finite-state machines, sequential and combinational logic, and other electronic circuits that can perform the functions necessary for the operation of the current invention. The processing element 22 may be in communication with the other electronic components through serial or parallel links that include address busses, data busses, control lines, and the like. The processing element 22 may be configured or programmed to perform functions including, at the least, methods 100, 200, 300, 400, 500 as described below in relation to FIGS. 3, 4, 5A, 5B, 8A, 8B, 9A, 9B, 10A, 10B, 11A, and 11B through hardware, software, firmware, or combinations thereof.

Figure 3:
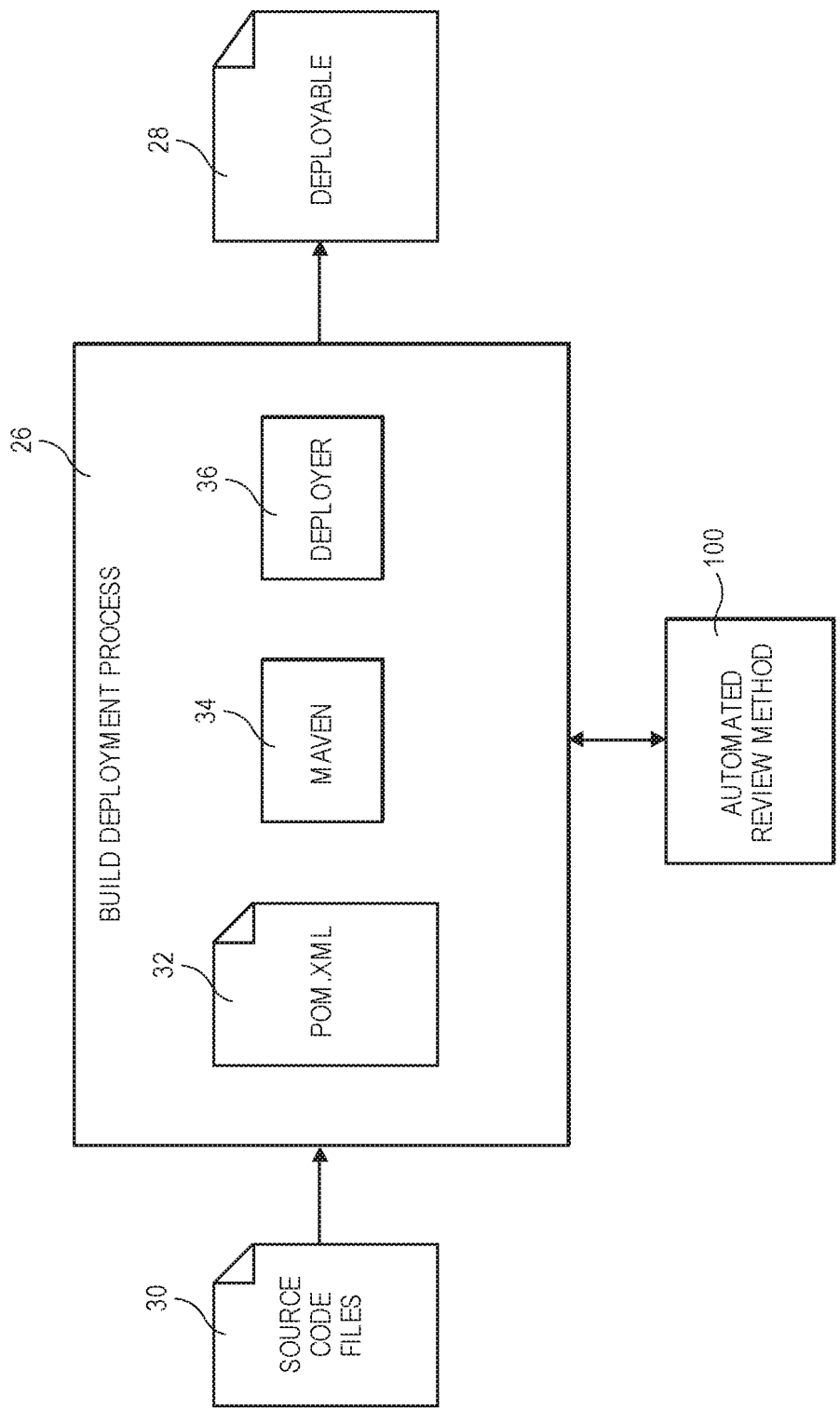
FIG. 3 is a block schematic diagram of one embodiment of a computer-implemented automated review method and a build and deployment process.
Figure 4:
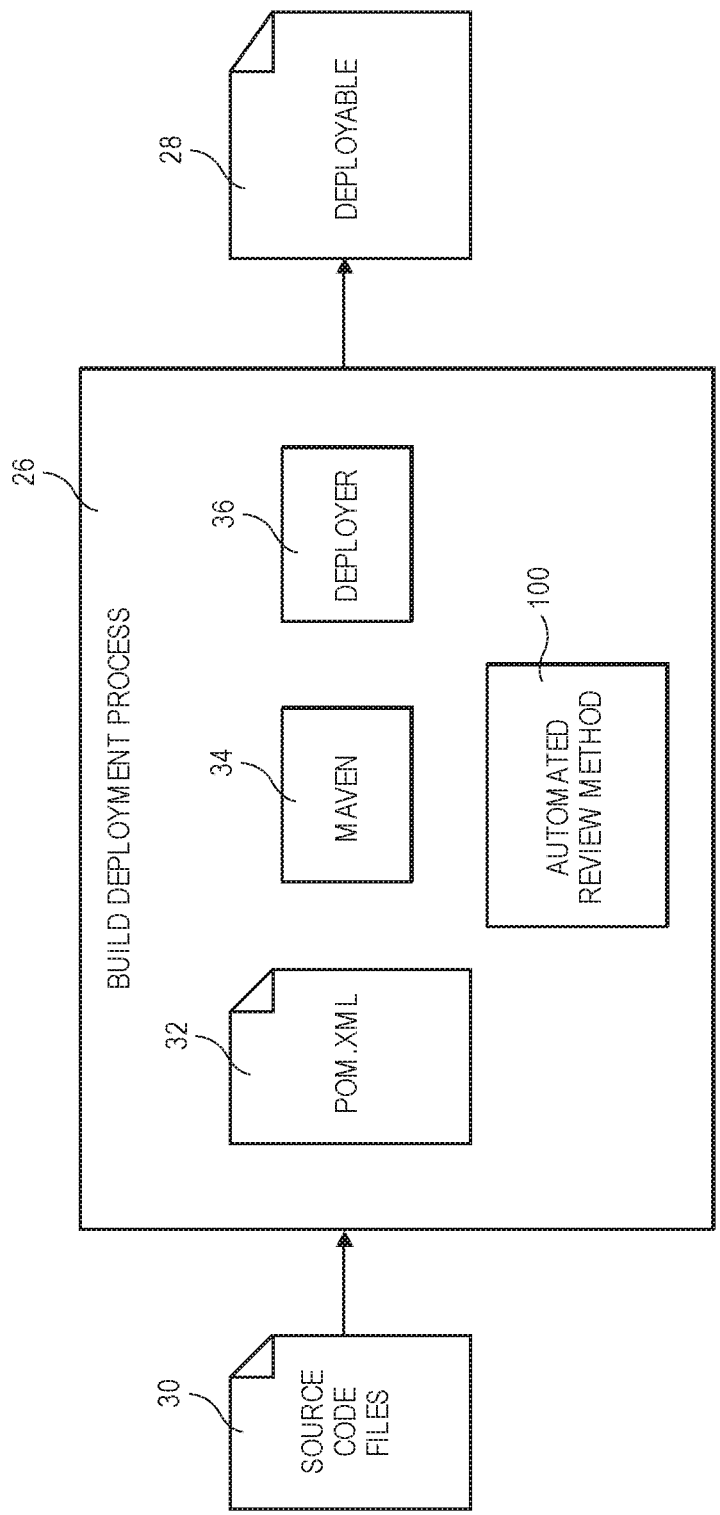
FIG. 4 is a block schematic diagram of another embodiment of the computer-implemented automated review method and the build and deployment process.

Referring now to FIGS. 3 and 4, a computer-implemented automated review method 100, may be associated with various embodiments or aspects of the current invention, and may be executed by the processing element 22 during a build and deployment process 26 implemented to create a deployable 28 that will be executed to provide access to the data store 16. The computer-implemented automated review method 100, discussed in more detail below, may review source code files 30 used to create the deployable 28 to determine an impact that the operations included in the source code may have on the data store 16 and the system hosting the data store 16.

In some embodiments, the automated review method 100 may be a logically separate process, as shown in FIG. 3, with which the build and deployment process 26 communicates. In other embodiments, the automated review method 100 may be a block, or plug-in, in the build and deployment process 26, as shown in FIG. 4.

The build and deployment process 26 may include a project object model in extensible markup language (pom.xml) file 32, a maven 34 plug-in, and a deployer 36 plug-in. The pom.xml file 32 provides a configuration for a project used to create the deployable 28, wherein the configuration includes information such as the project's name and owner and any dependencies on other projects. Maven 34 is an automated build tool used primarily for Java™ projects. Maven 34 is typically used with the pom.xml file 32. The deployer 36 may prepare the deployable 28 to operate in a particular environment.

Figure 6:
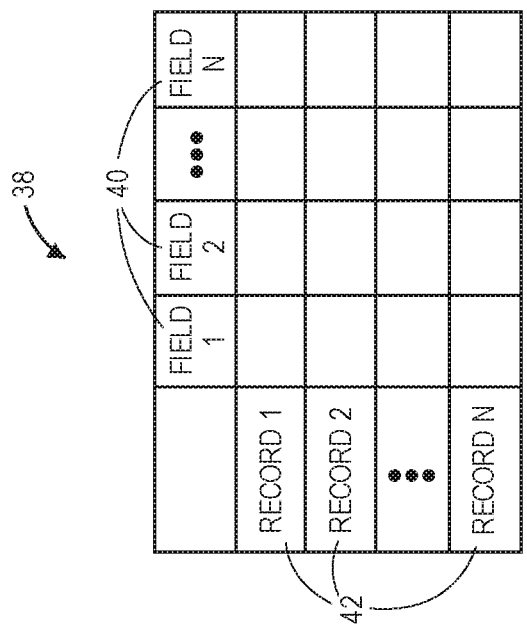
FIG. 6 is a diagram of a table including a plurality of fields and a plurality of records.
Figure 5:
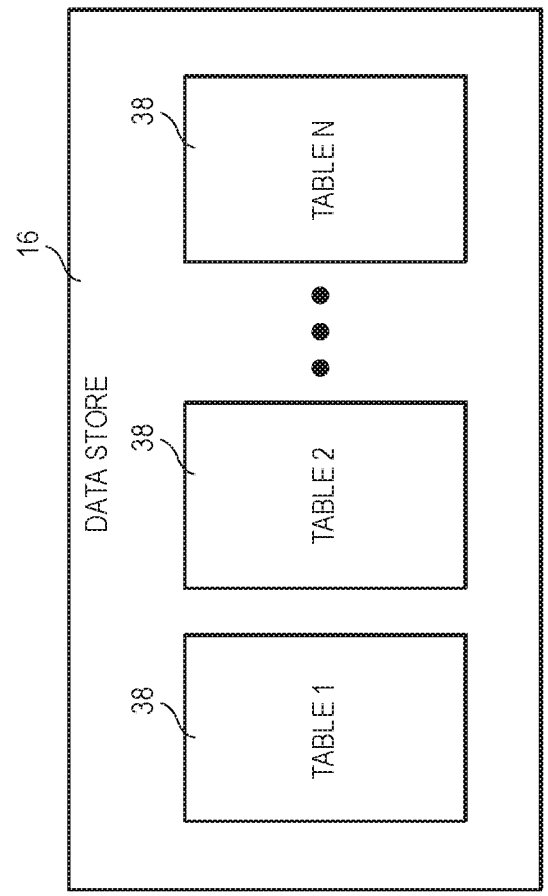
FIG. 5 is a diagram of a data store including a plurality of tables.

The data store access source code generally includes source code statements seeking to access the data store 16 to perform functions or operations such as querying, inserting, updating, deleting, or modifying data. The data store 16 may be a relational database and may include one or more tables 38 of data, as seen in FIG. 5. Each table 38 may include a plurality of cells formed by the intersections of a plurality of columns and a plurality of rows, wherein each column may be a field 40 that stores one item of data and each row may be a record 42 that includes the data stored in all of the columns, as seen in FIG. 6. Accordingly, each cell stores one field 40 of data for one record 42.

With the example of an insurance provider data store 16, there may be one table 38 for customer information, one table 38 for auto policy information, one table 38 for home policy information, etc. In the customer information table 38, each field 40 may store data such as a customer's name (one field 40 for first name, one field 40 for last name), a customer's address (one field 40 for street, one field 40 for city, etc.), and so forth. Each row may be a record 42 for one customer. In the auto policy table 38, each field 40 may store data such as a policy number, a make of a vehicle, a model of the vehicle, a year of the vehicle, a deductible amount of the policy, a coverage limit of the policy, and so forth. Each row may be a record 42 for one policy and may be related to one customer.

The data store access source code may be contained within the source code files 30 which are typically stored in a tree structure of folders and subfolders. The data store access source code include at least the following components: structured query language (SQL) source code stored in SQL source code files, data access object (DAO) source code stored in DAO source code files, and configuration source code stored in configuration source code files. The SQL source code files may be written in SQL and generally execute the operations within the data store 16. The DAO source code files may be written in Java™ and generally manage the connection to the data store 16. The configuration source code files may be written in extensible markup language (XML) and generally manage the configuration for a specific data store 16. Typically, each component (SQL source code files, DAO source code files, configuration source code files) is stored in a separate folder and/or set of subfolders.

At least a portion of the data store access source code files 30 may include service operations which may perform a business function, such as adding a new customer, adding a new policy, retrieving all of the data for an insurance policy, retrieving billing information, and the like, or may perform a record-keeping function, such as updating policy information, deleting policy information, archiving policy information, and so forth. The operation may be implemented in one source code file or multiple source code files.

The SQL source code may actually modify the data store 16 by adding, changing, or deleting data. Just as often, the SQL source code may simply retrieve data from the data store 16. The data may include one or more fields 40 in one or more records taken from one or more tables 38. Typically, each SQL source code file includes one or more SQL statements that forms an SQL component which performs one operation on the data store 16.

DAO source code, also known as "the DAO", generally provides a level of abstraction between the data in the data store 16 and business applications, or other software, that seek to access or modify the data. Business applications for an insurance provider may include creating or modifying one or more policies for a customer, generating billing for a customer, or the like. Thus, business applications may have the need to send or receive certain pieces of data to or from the data store 16, but may not be equipped to do so. The DAO source code may provide the interface between the data store 16 and the business applications. The DAO source code is typically written in Java™ and calls the SQL source code to actually engage with the data store 16, as discussed above. In general, the DAO source code may include various methods that form DAO components which perform business-related operations or functions on the data store 16, wherein each method may call an SQL component. When a business application needs to access the data store 16, it may call the appropriate one or more DAO components and provide the necessary input data, such as inputs needed to retrieve data, like a customer's name, or inputs that are to be stored in the data store 16. The DAO components may pass the input data to the appropriate one or more SQL components which access the data store 16. If there is data to be returned to the business application, the SQL components pass the data back to the DAO components, which return the data to the business application as an object. Thus, the DAO source code files may include definitions as to the types of data that they receive as inputs from a business application, the types of data that they pass on to SQL components, the types of data that they receive from SQL components, and the types of data that they return to the business application.

Configuration source code files generally manage how the DAO components and SQL components connect to the data store 16. At least a portion of the configuration source code files may be written in XML and may include definitions, some of which are known as "beans", for objects, pointers, variables, and the like that are included in the SQL and DAO source code. For example, the SQL and DAO source code may read, write, or modify data in one or more data stores 16, wherein the data stores 16 are referred to with variable names. The configuration source code may define those variable names with a specific path or address to the one or more data stores 16. Other objects may be defined in a similar fashion. Properties for specific servers, such as locations of files, may be defined as well. In addition, pointers to specific software drivers, such as the JDBC driver, may be defined. Having these types of properties defined in configuration source files, rather than explicitly coded in the SQL and DAO source code, allows the SQL and DAO source code to be scalable, portable, and easily reconfigurable. Thus, the same SQL and DAO source code files can be deployed in different organizations, in the same organization where the location of the data stores 16 have changed, in organizations with different software drivers or other parameters, and so forth.

The configuration files and/or DAO files may also declare that operations which modify the data store 16, such as by adding, changing, or deleting data, are "transactions". For example, the steps that add a new customer or add a new policy to an existing customer may be declared a transaction. Declaring these types of operations as transactions ensures that the modifications do not occur until all the steps are performed. This prevents faulty data from being entered into the data store 16 in the event of an error occurring before the transaction is finished. Thus, either all of the modifications are made or none of the modifications are made.

The configuration files and/or DAO files may further define a datasource, which is used to instantiate a connection to the data store 16. Within an enterprise, there are generally default configuration parameters that are assigned to any connection which affect certain constraints such as memory sizing, timeouts, locking, thread management, and the like.

Figure 7A:
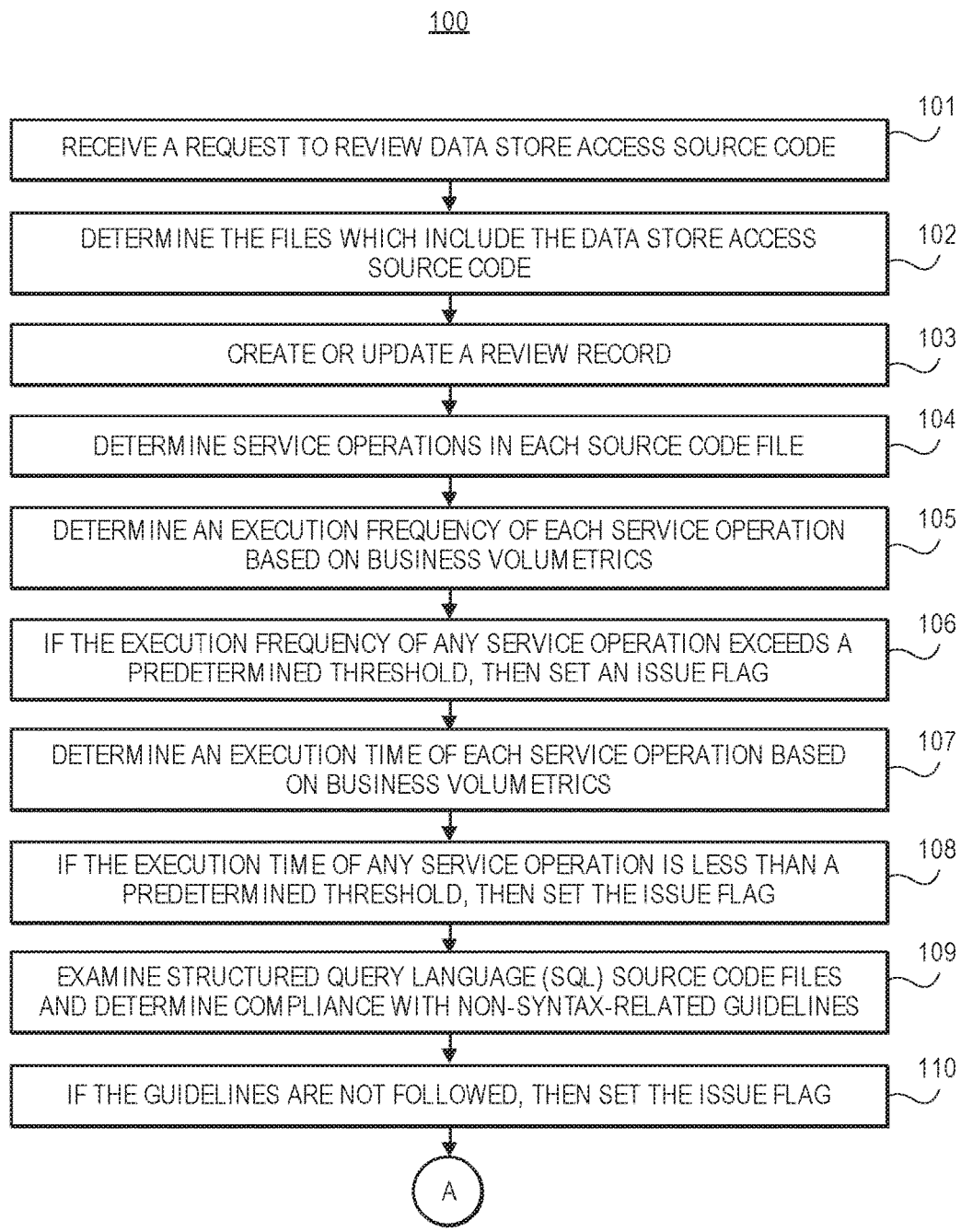
FIGS. 7A and 7B depict a listing of at least a portion of the steps of a computer-implemented automated review method for data store access source code files.
Figure 7B:
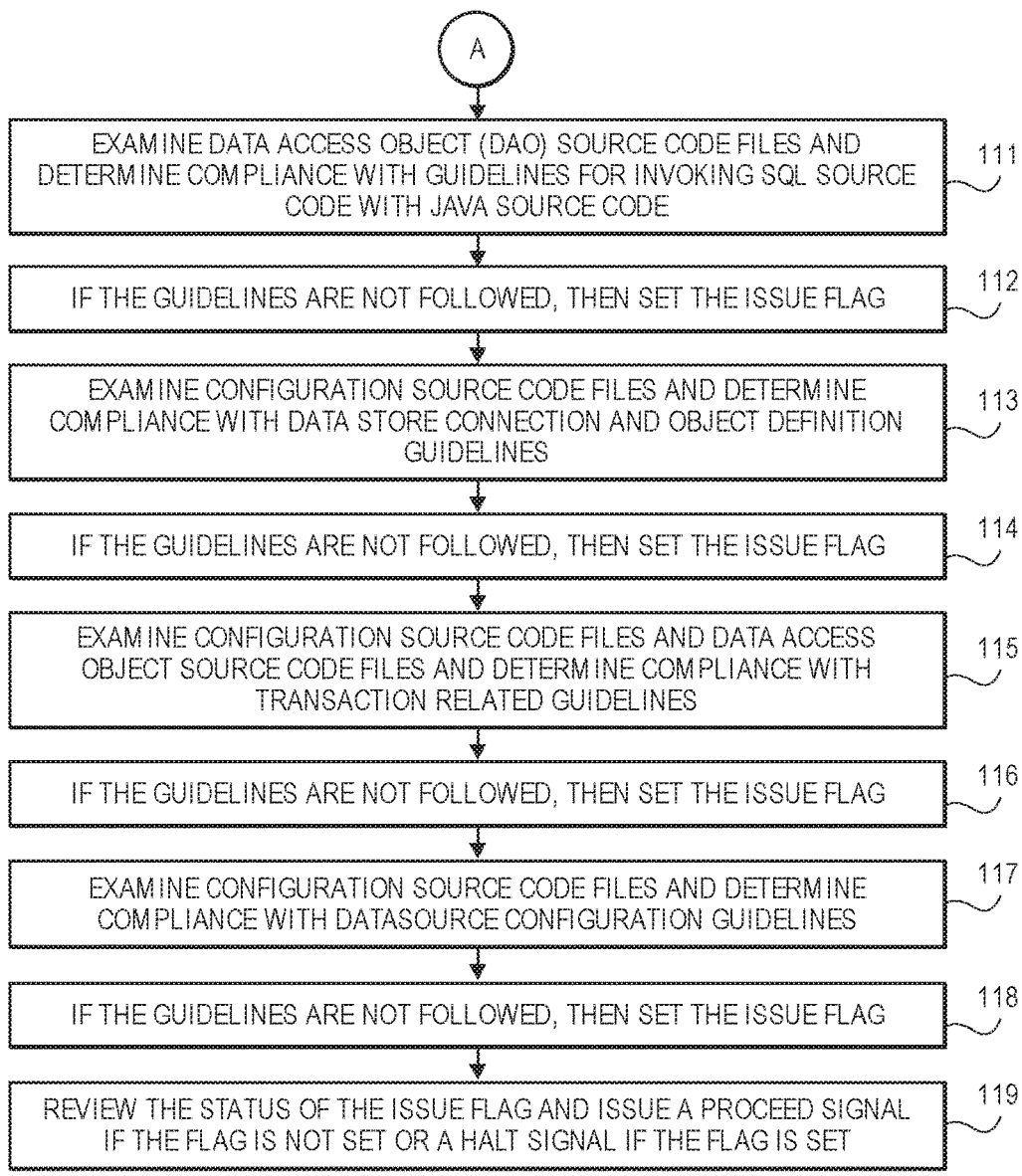

Referring now to FIGS. 7A and 7B, a listing of at least a portion of the steps of an exemplary computer-implemented automated review method 100 for data store access source code files is depicted. The steps may be performed in the order shown in FIGS. 7A and 7B, or they may be performed in a different order. Furthermore, some steps may be performed concurrently as opposed to sequentially. In addition, some steps may be optional or may not be performed.

Referring to step 101, a request to review data store access source code is received. The request may come from a group of coders or programmers in a business unit or other department within an organization. The group may be requesting the review for new source code that performs an operation not previously executed or for a modification of existing source code. The request may be generated automatically by one of the electronic devices 12, a computer server, or the like.

Typically, the structure of the data store 16, which is to be accessed, is known before the request is received. For example, the number of tables 38, the number of fields 40 and records 42 in each table 38, as well as the type of data in each field 40, among other parameters, may be known. Some steps of the automated review method 100 may check the source code for operations that impact specific tables 38, fields 40, or records 42 within the data store 16. The automated review method 100 may be programmed or configured with the structure of the data store 16 in order to perform the checks properly.

Referring to step 102, the files which include the data store access source code are determined. The data access source code files 30 may be transmitted to, and stored on, the computing device 10 when the request for review is made. The files 30 may be submitted individually or as a package, such as a zip or archive file. Alternatively, the request may include a pointer to where the data store access source code files 30 are stored on one or more electronic devices 12 or computer servers that the computing device 10 can access in order to review the files. The automated review method 100 may determine a file name, a type of source code, and a location of each of the data store access source code files 30.

Referring to step 103, a review record is created. The review record may include details of the automated review method 100, such as a listing of each step that was performed, names of the source code files 30 that were reviewed in each step, results of each step, and so forth. The details may be recorded as each step of the method occurs.

Referring to step 104, service operations in each source code file are determined. The automated review method 100 may parse the contents of the source code files to search for specific keywords, or combinations of keywords, that may be indicative of service operations.

Referring to step 105, an execution frequency of each service operation is determined based on business volumetrics—which refers to an amount of business-related transactions or operations that occur over time. The business units within an organization, such as an insurance provider, may be able to determine how often, on average, per time period, such as a day, an hour, etc., they need to access the data store 16 to transact data. The execution frequency of these transactions or operations may be based on volumetrics that are dependent upon parameters such as a period of a billing cycle, current number of customers, projected customer growth, current number of agents or others who access the data store 16, among others.

Referring to step 106, the issue flag is set if the execution frequency of any service operation exceeds a frequency threshold for each service operation. System administrators or data store managers may determine threshold values for each type of operation to be executed. The threshold values may depend on, or vary according to, system hardware parameters such as server access speed, server capacity, network throughput rates, and so forth. The threshold values may also depend on software-related parameters. The method 100 may compare the execution frequencies determined in the previous step with the frequency thresholds provided in the current step and may set the issue flag according to the outcome. For example, if an execution frequency of updating or adding a new insurance policy is 2,000 times per day and a frequency threshold for that type of operation is 2,500 times per day, then the issue flag is not set. But, if an execution frequency of retrieving policy information is 75,000 times per day and a frequency threshold for that type of operation is 50,000 times per day, then the issue flag is set because the frequency exceeded the threshold. When the issue flag is set, the service operation may also be recorded.

Referring to step 107, an execution time for at least a portion of the service operations is determined. The execution time may be the (maximum) period of time that the service operation should take to complete. The execution time may be determined by real-time operational considerations. For example, if a customer is trying to add or access account or policy information, such as through a web site, then there is a maximum time that the customer should have to wait for the access to occur. These execution times may be set by business units.

Referring to step 108, the issue flag is set if the execution time of any service operation is less than an execution time threshold. Like the execution frequency thresholds, the execution time thresholds may be determined by system administrators or data store managers and may depend on, or vary according to, similar criteria. When the issue flag is set, the service operation may also be recorded.

Referring to steps 109 and 110, SQL source code files are examined. The automated review method 100 may determine whether the SQL source code complies with guidelines that are not related to checking a syntax of the source code, wherein syntax is generally known as a set of structural and formal rules to which the source code must adhere for it to be executed on a machine or device. One of the motivations for examining the SQL source code to consider issues other than syntax is that the source code may be syntactically correct but may be inefficient in its execution or may attempt to perform operations that are bad practice. Thus, the guidelines include considerations such as determining whether any service operations included in the source code occur with a high frequency, determining a performance cost of operations in the source code, determining the occurrence of specific SQL commands which are known to be time-consuming or resource-intensive to execute, determining whether a type of data to be written to the data store 16 matches a type of data in the data store 16, and so forth.

Examining the SQL source code files may involve scanning all of the SQL source code files and parsing the contents to search for specific keywords, or combinations of keywords, as determined by the guidelines. If any of the guidelines are not met, then an issue flag is set and the guidelines which were not met are recorded.

Referring to steps 111 and 112, DAO source code files are examined. The automated review method 100 may determine whether the DAO source code complies with guidelines for invoking SQL components within Java™ source code. For example, the guidelines may include checking for usage of spring Java™ database connectivity (JDBC) framework, checking for proper invocation of SQL components, checking that a type of data passed to the SQL components matches a type of data expected by the SQL components, checking that the DAO source code returns objects, and so forth.

Examining the DAO source code files may involve scanning all of the DAO source code files and parsing the contents to search for specific keywords, or combinations of keywords, as determined by the guidelines. If any of the guidelines are not met, then the issue flag is set and the guidelines which were not met are recorded.

Referring to steps 113 and 114, configuration source code files are examined. The automated review method 100 may determine whether the configuration source code complies with guidelines for data store 16 connection and object definitions. For example, the guidelines may include checking a version number of a Spring namespace to be utilized in the deployment process, checking a version number of a JDBC driver, checking that the database bean points to the data store 16, checking for a presence of Java™ templates, checking that pointers to open source framework software, such as Spring JDBC, are correct, and so forth.

Examining the configuration source code files may involve scanning all of the configuration source code files and parsing the contents to search for specific keywords, or combinations of keywords, as determined by the guidelines. If any of the guidelines are not met, then the issue flag is set and the guidelines which were not met are recorded.

Referring to steps 115 and 116, the configuration source code files and DAO source code files are further examined. The automated review method 100 may determine whether the configuration source code and DAO source code complies with guidelines for defining transactions. For example, the guidelines may include checking for the presence of a transaction manager definition, checking that the boundary of a transaction is at an outer boundary of a service object or DAO method, checking whether there are loop statements within a DAO method, checking for exception handling within a DAO method, and so forth. If any of the guidelines are not met, then the issue flag is set and the guidelines which were not met are recorded.

Referring to steps 117 and 118, the configuration source code files and DAO source code files are further examined. The automated review method 100 may determine whether the configuration source code and DAO source code complies with guidelines for defining the datasource configuration. For example, the guidelines may include checking for a definition of the datasource, checking for asynchronous flows, and so forth. If any of the guidelines are not met, then the issue flag is set and the guidelines which were not met are recorded.

Referring to step 119, the status of the issue flag is reviewed. If it is not set, then a proceed signal may be generated and the source code files may be deployed. If the issue flag is set, a halt signal may be generated. IT personnel may determine which guidelines were not met and may identify the associated source code files. In some situations, there may be other ways to execute the operations that were intended, and the source code may be rewritten. In other situations, there may be no other way to perform some operations and the source code may be deployed as submitted. In some cases, the source code may be deployed during off-peak hours.

Figure 8A:
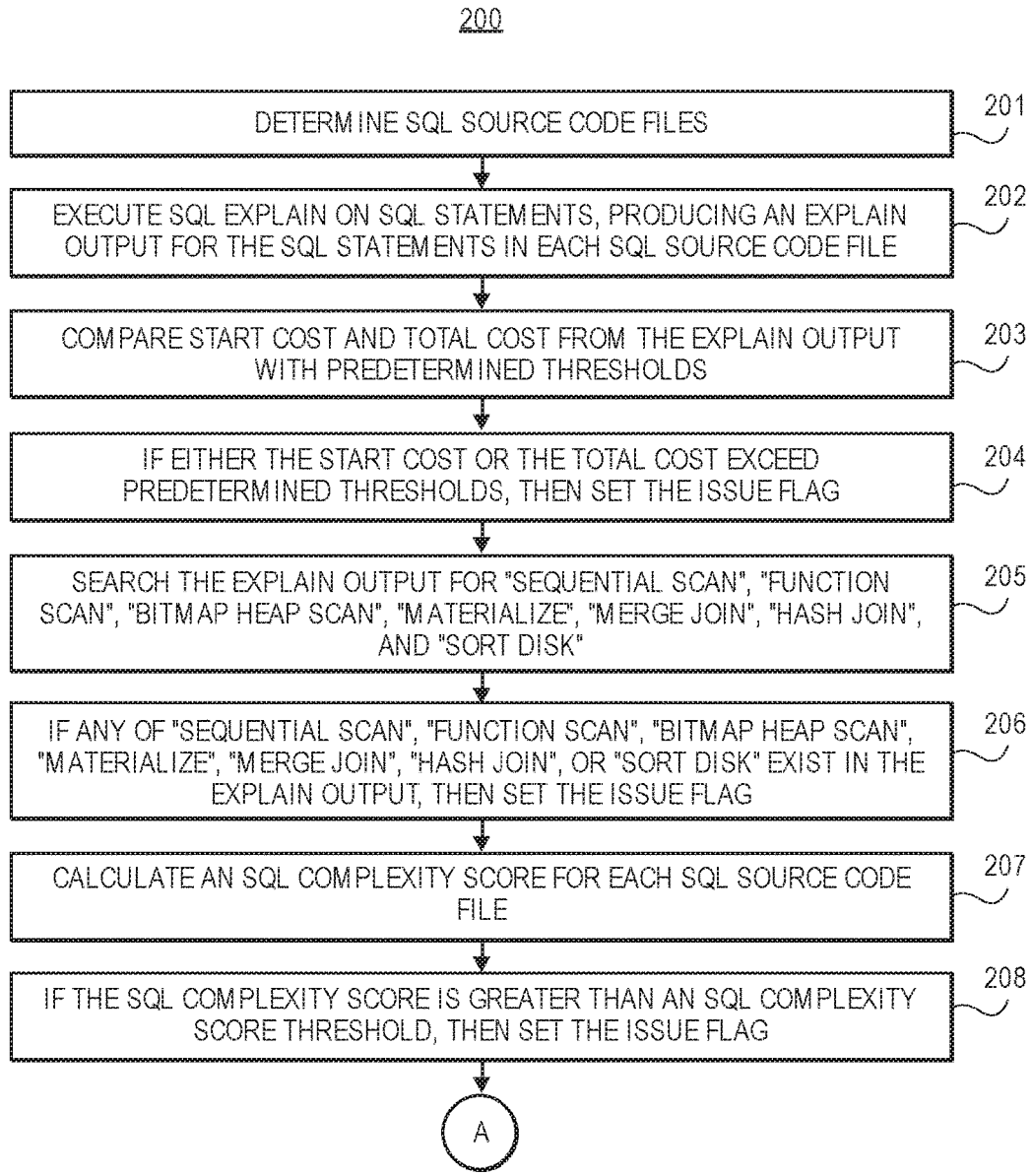
FIGS. 8A and 8B depict a listing of at least a portion of the steps of a computer-implemented automated review method for structured query language (SQL) source code files for data store access.
Figure 8B:
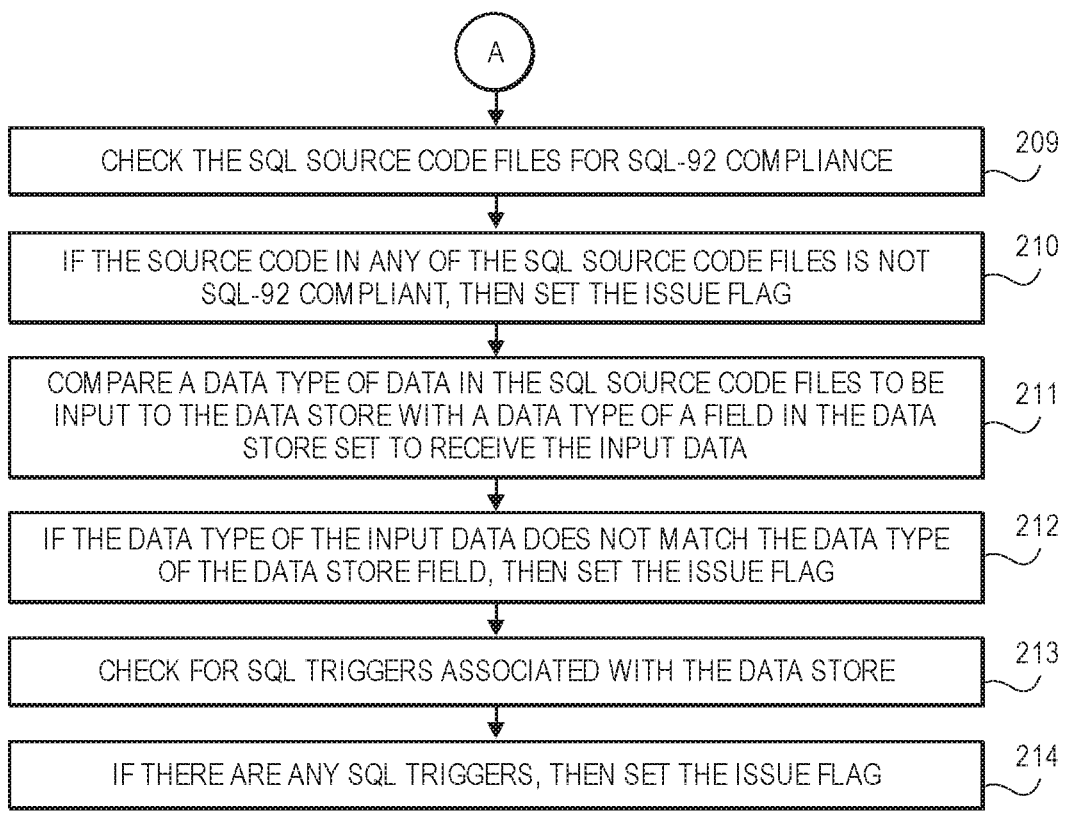

Referring now to FIGS. 8A and 8B, a listing of at least a portion of the steps of an exemplary computer-implemented automated review method 200 for SQL source code files for data store access is depicted. The steps may be performed in the order shown in FIGS. 8A and 8B, or they may be performed in a different order. Furthermore, some steps may be performed concurrently as opposed to sequentially. In addition, some steps may be optional or may not be performed.

Referring to step 201, SQL source code files are determined. In some cases, SQL source code files are part of a bigger package that is created to access one or more data stores 16. The package may include a plurality of source code files 30, wherein the source code files 30 are typically stored in a tree structure of folders and subfolders. Generally, each SQL source code file may include SQL statements that perform one type of operation on the data store 16, such as adding one or more records to the data store 16, retrieving data based on certain parameters, etc. The automated review method 200 may determine SQL source code files as part of a request that is received to automatically review the entire package of source code files seeking to access the data store 16 or a request to review just the SQL source code files. The request may come from a group of coders or programmers in a business unit or other department within an organization. The group may be requesting the review for new source code that performs an operation not previously executed or for a modification of existing source code. The automated review method 200 may determine a file name and a location of each of the SQL source code files.

Referring to step 202, SQL "explain" is executed on SQL statements, producing an explain output for the SQL statements in each SQL source code file. The SQL explain is a command which takes SQL statements as arguments. The SQL explain may be executed in a database software development environment which performs an analysis of the SQL statements and may generate an explain output for the SQL statements. The explain output may include a listing of information about a sequence of operations that a software development optimizer for the database environment would perform to execute the SQL statements. The listing may include costs associated with various operations, such as joining or scanning, as well as dimensions of a block of data that is to be created as a result of the operation. The costs may include both a start-up cost and a total cost, wherein the costs are given in units of time, such as the time that elapses before the particular operation can begin and the time that elapses until the operation completes. Many operations either send a block of data to, or receive a block of data from, the data store 16. The dimensions of the block of data may include the numbers of rows involved and the width of each row given in bytes.

In some situations, each SQL source code file may be included as the argument for one SQL explain command. In other situations, the automated review method 200 may parse the contents of the SQL source code files to search for just a portion of the SQL statements included therein.

Referring to steps 203 and 204, the start-up cost and total cost of a parent node in the explain output are compared to predetermined thresholds. The explain output listing may include a plurality of operations that are performed. Each operation may also be considered a "node". The parent node may be the first operation that is listed. The start-up cost may be compared to a start-up threshold, and the total cost may be compared to a total threshold. If either cost is greater than its associated threshold, then the issue flag is set and the cost which exceeded its associated threshold may be noted.

Referring to steps 205 and 206, the explain output is searched for scanning and joining operations that are performed. The scanning operations are typically used to scan through one or more tables 38 within the data store 16. The scanning operations may be implemented without using indexes, or using indexes in a potentially incorrect fashion. When scans are performed without using an index, they are very inefficient, because every record 42 in the table 38 may be read in searching for a particular value. The joining operations may retrieve data from multiple tables 38 within the data store 16 based on a search criteria. In some cases, a second table 38 may be scanned for an associated record 42 each time a match to the search criteria is found in a first table 38. This operation could also be inefficient in the absence of using indexes. The relevant operations may include "sequential scan", "function scan", "bitmap heap scan", "materialize", "merge join", "hash join", and "sort disk", among others. The automated review method 200 may parse the contents of the explain output to search for these keywords. If any of the listed keywords are found, then the issue flag is set, and the matching keyword may be noted.

Referring to steps 207 and 208, an SQL complexity score is calculated. The SQL complexity score does not necessarily rate the complexity of the SQL source code, but rather the duration of computer/server run time, the amount of storage space, and other factors required to implement the SQL statements. The SQL complexity score is the result of an algorithm that quantitatively analyzes the SQL statements. The algorithm sequentially parses an SQL source code file, or a series of SQL statements, and increments the SQL complexity score for selected command keywords and/or operators in the SQL source code file by a weighted value. Keywords may include "join", "select", "update", "delete", "group by", and so forth. Operators may include "=", "!=", "<", ">", and the like. The weighted value may vary according to the resources, such as run time and storage space, required to implement the SQL statement formed by the keywords and operators. In general, keywords and operators that require more resources receive a higher weighted value. Keywords and operators that require less resources receive a lower weighted value. The algorithm that generates the SQL complexity score is described in greater detail in U.S. patent application Ser. No. 15/410,156, entitled "AUTOMATIC REVIEW OF SQL STATEMENT COMPLEXITY", filed Jan. 19, 2017. The cited patent application is hereby incorporated by reference in its entirety into the current document. If the SQL complexity score is greater than an SQL complexity score threshold, then set the issue flag and record the SQL complexity score.

Referring to steps 209 and 210, the SQL source code files are checked for SQL-92 compliance. Other versions of SQL source code may utilize syntax that is incompatible with the build and deployment process. For example, SQL join statements should be written in an explicit manner using the JOIN clause, rather than in implicit join operations. The automated review method 200 may parse the contents of the SQL source code files to search for specific keywords, or combinations of keywords, that may be indicative of SQL-92. If the SQL source code files are not SQL-92 compliant, then the issue flag is set and SQL-92 non-compliance is recorded.

Referring to steps 211 and 212, a data type of data in the SQL source code files to be input to the data store 16 is compared with a data type of a field 40 in the data store 16 set to receive the input data. Data to be stored in the data store 16 is stored in one or more fields 40 in one or more tables 38. Each field 40 may store a certain type of data, such as text or string, numeric (real, integer, etc.), binary, Boolean, and so forth. In addition, each field 40 may have a name. The structure of the data store 16, including the composition of each table 38 with the names and data types of each field 40, etc., may be known to the automated review method 200. The SQL source code may include objects or variables, with a declared data type, that retain data to be stored in the data store 16. The SQL source code may also include statements in which data from an object is written to, or stored in, one or more fields 40 (identified by name) in the data store 16. The automated review method 200 may parse the SQL source code files to determine the objects and their data type. The method 200 may also determine those statements in which data storage is occurring and may compare the data type of the object with the data type of the field 40 into which data is to be stored. If the data type of the object does not match the data type of the field 40, then the issue flag is set and the mismatched data types may be recorded.

Referring to steps 213 and 214, the SQL source code is checked for SQL triggers associated with the data store 16. A triggers is a set of commands or operations that activates when a triggering event, such as an SQL command being executed, occurs. Triggers may be utilized for purposes such as event logging and storing information on table access, auditing, imposing security authorizations, preventing invalid transactions, and so forth. For example, a trigger may be created to activate whenever an SQL "insert" or "delete" command is executed. The trigger may include adding information, such as a user's ID or name and a timestamp, or the like, to a log file whenever the user inserts data into, or deletes data from, the data store 16. The automated review method 200 may parse the SQL source code files to search for trigger definitions, including the keyword "trigger". If an SQL trigger is found, then the issue flag is set and the trigger type or location in the source code may be recorded.

After step 214, the status of the issue flag may be reviewed. If it is not set, then a proceed signal may be generated and the source code files may be deployed. If the issue flag is set, a halt signal may be generated.

Figure 9A:
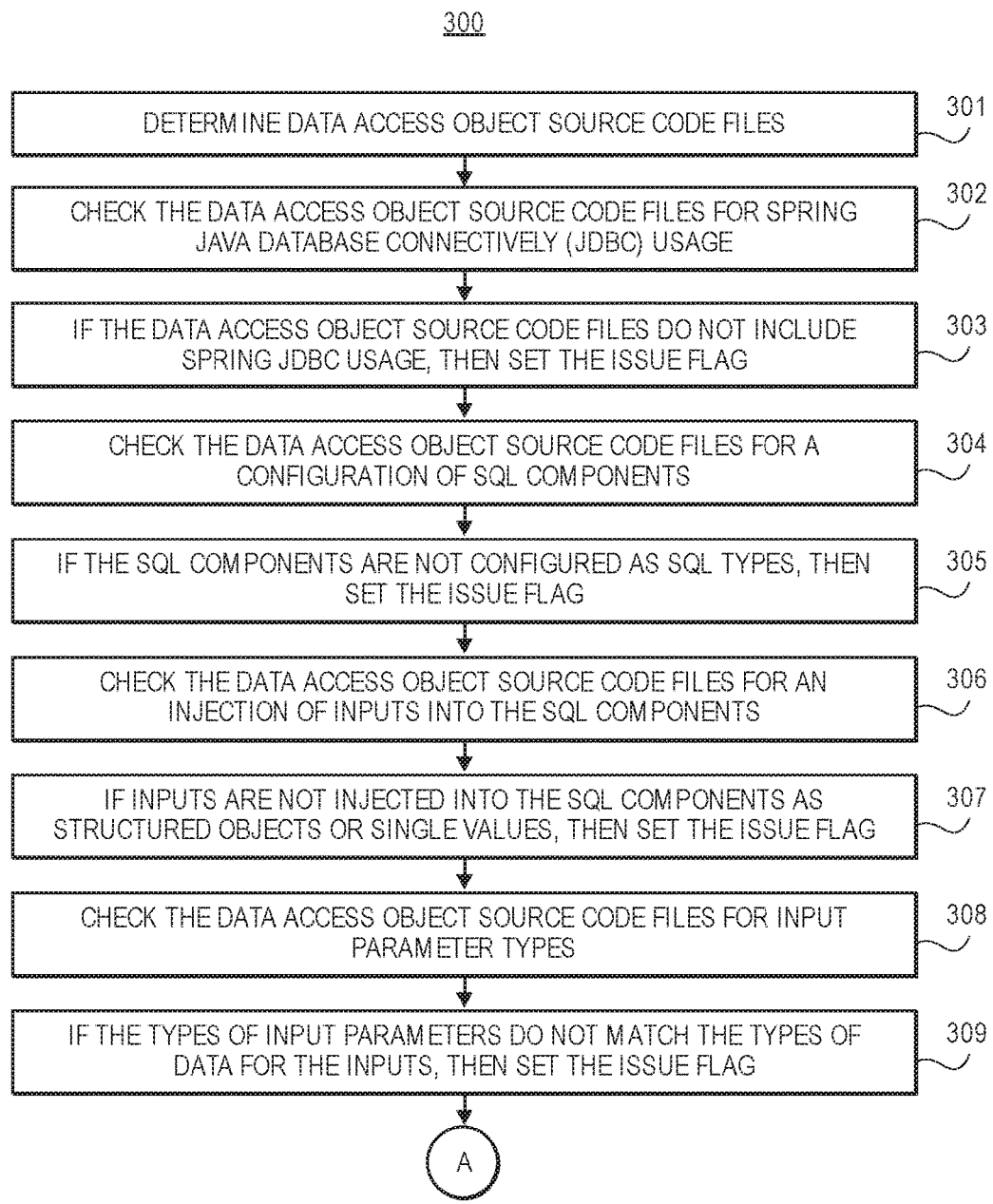
FIGS. 9A and 9B depict a listing of at least a portion of the steps of a computer-implemented automated review method for data access object (DAO) source code files for data store access.
Figure 9B:
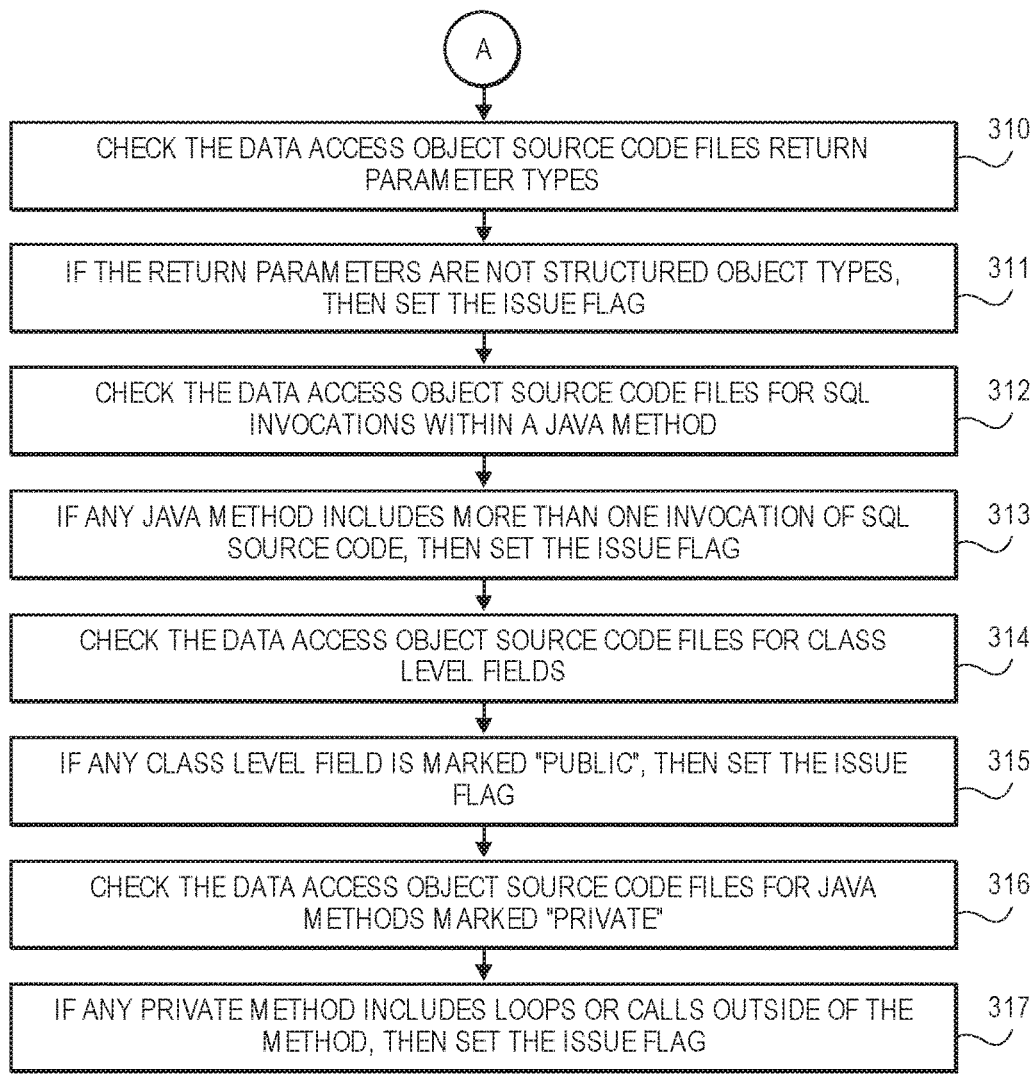

Referring now to FIGS. 9A and 9B, a listing of at least a portion of the steps of an exemplary computer-implemented automated review method 300 for DAO source code files for data store access is depicted. The steps may be performed in the order shown in FIGS. 9A and 9B, or they may be performed in a different order. Furthermore, some steps may be performed concurrently as opposed to sequentially. In addition, some steps may be optional or may not be performed.

Referring to step 301, DAO source code files are determined. In some cases, DAO source code files are part of a bigger package that is created to access one or more data stores 16. The package may include a plurality of source code files 30, wherein the source code files 30 are typically stored in a tree structure of folders and subfolders. DAO source code files are typically written in Java™ and each source code file may include one or more methods which perform a single business-related operation or limited business-related functions. In addition, each DAO source code file may call one or more SQL components or SQL source code files. When a business application needs to access the data store 16, it may send or receive data to or from one or more DAO components, which in turn may send or receive data to or from one or more SQL components, which actually access the data store 16. The automated review method 300 may determine DAO source code files as part of a request that is received to automatically review the entire package of source code files seeking to access the data store 16 or a request to review just the DAO source code files. The request may come from a group of coders or programmers in a business unit or other department within an organization. The group may be requesting the review for new source code that performs an operation not previously executed or for a modification of existing source code. The automated review method 300 may determine a file name and a location of each of the DAO source code files.

Referring to steps 302 and 303, the DAO source code files are checked for database connectivity framework usage, such as Spring Java™ database connectivity (JDBC). Spring JDBC is an open source framework that is used to execute SQL source code to access the data store 16. The Spring JDBC framework may include data class and object definitions which identify the data of the class or object as a specific type. Strong typing in the definitions helps to avoid confusion as to the type of data to be received from a business application that may call the DAO source code. The automated review method 300 may parse the DAO source code files to examine the import statements in each DAO source code file. If the import statements do not include at least one instance of "org.springframework.jdbc", then the issue flag is set and the lack of org.springframework.jdbc may be recorded. The automated review method 300 may also parse the DAO source code files for class and object definitions. If each class definition does not include "namedParamJDBCTemplate" as an object, then the issue flag is set and the lack of namedParamJDBCTemplate may be recorded.

Referring to steps 304 and 305, the DAO source code files are checked for a configuration of the SQL components. As mentioned above, the DAO source code files call SQL components or source code files typically within a method. Each SQL component is configured or defined in a class definition and should be defined as type "SQL". The automated review method 300 may parse the DAO source code files for class definitions and instances of SQL components within the class definitions. If each SQL component in each class definition is not of type "SQL", then the issue flag is set and the lack of SQL typing and its associated class may be recorded.

Referring to steps 306 and 307, the DAO source code files are checked for an injection of inputs into the SQL components. When the DAO source code calls an SQL component, an input is often provided to the SQL component. For example, when data is to be stored in the data store 16, the data may be passed to the SQL components which store data in the data store 16. Or, when data, such as policy information, is to be retrieved from the data store 16, an input, such as a customer name or ID, may be passed to the SQL components that retrieve data from the data store 16. To avoid problems with storing or retrieving data from the data store 16, the inputs that are passed to the SQL components should be typed as either structured objects or single values. The automated review method 300 may parse the DAO source code files for instances where SQL components are called and data is passed to the SQL component as an input. If each input is not typed as a structured object or a single value, then the issue flag is set and the name of the DAO source code file in which the input is not typed as a structured object or single value may be recorded.

Referring to steps 308 and 309, the DAO source code files are checked for a data type of the inputs into the SQL components. Not only should the inputs to SQL components be a structured object or a single value (as checked in the previous step), the inputs from the DAO source code should have the same data type as the SQL components are expecting. For example, if the SQL component is expecting to, or defined to, receive a text or string input, such as for a customer name, then the object from the DAO source code providing the input should be a text or string data type. The automated review method 300 may parse the DAO source code files for instances where SQL components are called and data is passed to the SQL component as an input. If the data type of the input from the DAO source code does not match the data type that the SQL component should receive, then the issue flag is set and the name of the DAO source code file in which the input is not of the proper type may be recorded.

Referring to steps 310 and 311, the DAO source code files are checked for data returned from the SQL components. When a DAO component calls an SQL component, sometimes data is returned, or output, from the SQL component, such as when data is retrieved from the data store 16. That data is received by the DAO component and forwarded on to the business application which requested the data. For similar reasons as having the inputs to the SQL components be structured objects or single values, while the data is handled by the DAO component, the data should be typed as a structured object or a single value. The automated review method 300 may parse the DAO source code files for instances where SQL components are called and data is returned or received from the SQL component as an output. If the data received from the SQL component is not typed as a structured object or a single value, then the issue flag is set and the name of the DAO source code file in which the output data is not typed as a structured object or single value may be recorded.

Referring to steps 312 and 313, the DAO source code files are checked for SQL invocations within a method, such as a Java™ method. The automated review method 300 may parse the DAO source code files for instances where SQL components are invoked within a Java™ method. If more than one SQL component is invoked per Java™ method, then the issue flag is set and the name of the Java™ method in which more than one SQL component is invoked may be recorded.

Referring to steps 314 and 315, the DAO source code files are checked for class level fields. The class level fields are those fields declared within a class, but not a method. To avoid problems created by the data within a class being shared, the fields within a class may be defined as "private", as opposed to "public". The automated review method 300 may parse the DAO source code files for fields that are defined within a class. If any of the fields within any class defined in any DAO source code file are not defined as private, then the issue flag is set and the name of the class in which a field is not defined as private may be recorded.

Referring to steps 316 and 317, the DAO source code files are checked for methods, such as Java™ methods, that are defined as "private". Those methods defined as private can only be accessed by other methods or objects within the same Java™ class. Therefore, any loops that attempt to communicate outside of the method or any calls to other methods may cause problems. The automated review method 300 may parse the DAO source code files for Java™ methods that are defined as private. If the method includes any loops or calls that attempt to communicate outside of the method, then the issue flag is set and the name of the method may be recorded.

After step 317, the status of the issue flag may be reviewed. If it is not set, then a proceed signal may be generated and the source code files may be deployed. If the issue flag is set, a halt signal may be generated.

Figure 10A:
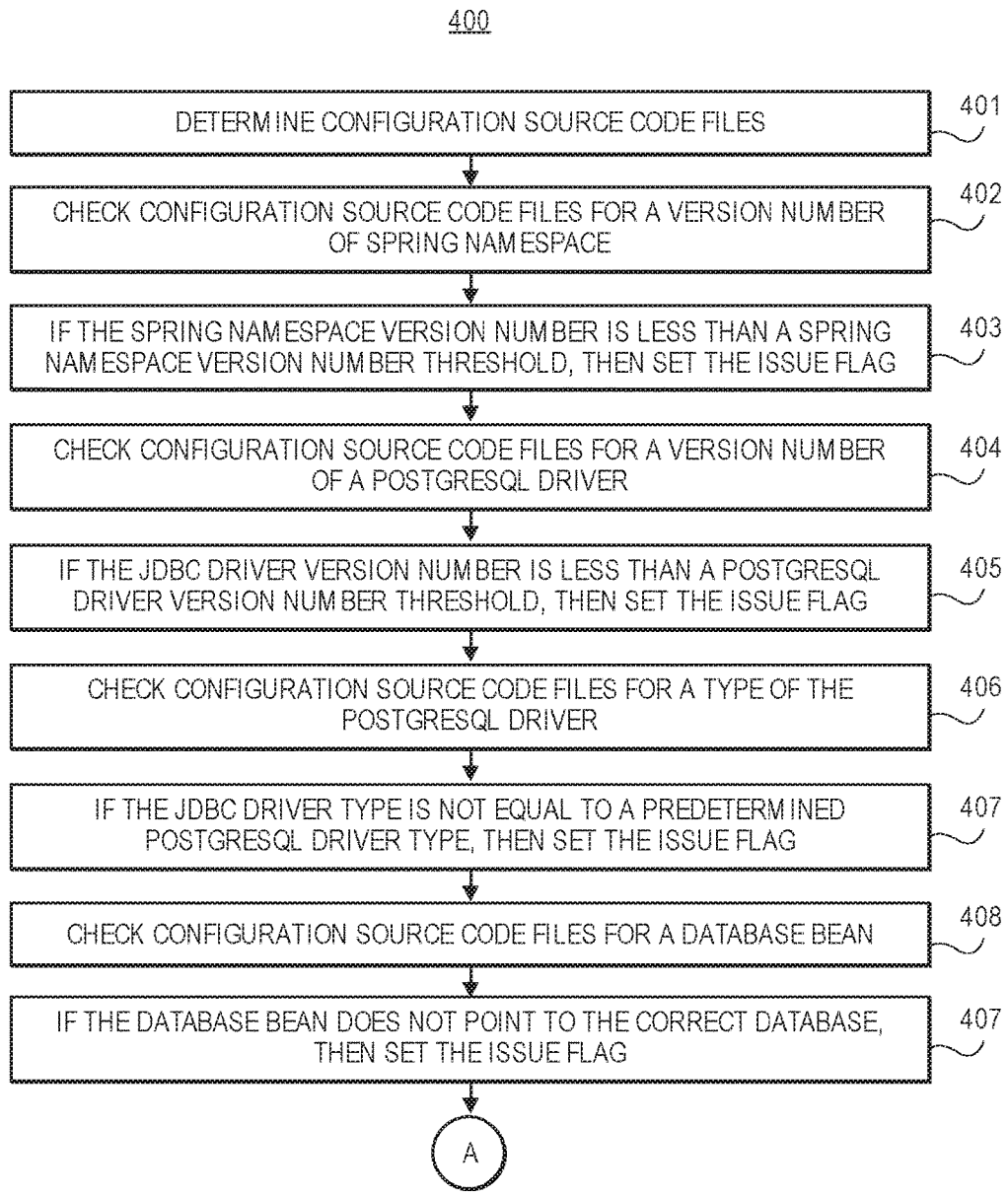
FIGS. 10A and 10B depict a listing of at least a portion of the steps of a computer-implemented automated review method for configuration source code files for data store access.
Figure 10B:
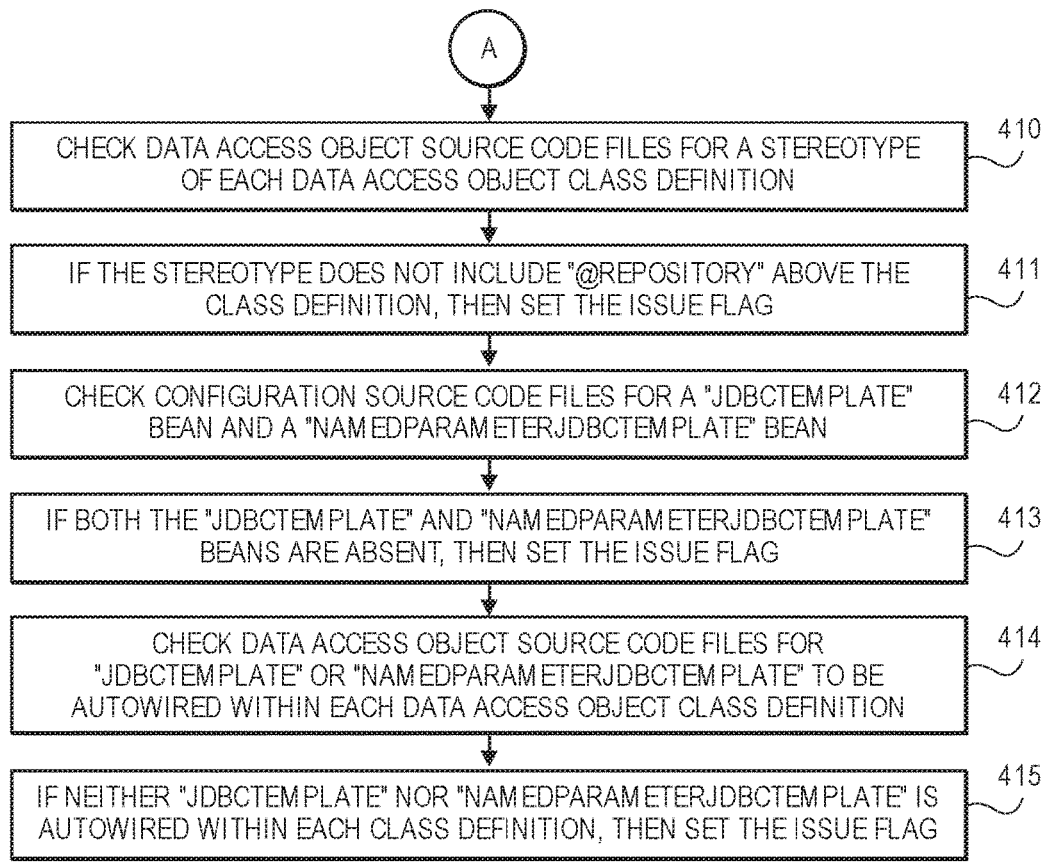

Referring now to FIGS. 10A and 10B, a listing of at least a portion of the steps of an exemplary computer-implemented automated review method 400 for configuration source code files for data store access is depicted. The steps may be performed in the order shown in FIGS. 10A and 10B, or they may be performed in a different order. Furthermore, some steps may be performed concurrently as opposed to sequentially. In addition, some steps may be optional or may not be performed.

Referring to step 401, configuration source code files are determined. In some cases, the configuration source code files are part of a bigger package that is created to access one or more data stores 16. The package may include a plurality of source code files 30, wherein the source code files 30 are typically stored in a tree structure of folders and subfolders. Configuration source code files generally manage how the DAO components and SQL components connect to the data store 16. At least a portion of the configuration source code files may be written in XML and may include definitions, some of which are known as "beans", for objects, pointers, variables, and the like that are included in the SQL and DAO source code. The configuration source code files may also be known as "spring wiring". The automated review method 400 may determine configuration source code files as part of a request that is received to automatically review the entire package of source code files seeking to access the data store 16 or a request to review just the configuration source code files. The request may come from a group of coders or programmers in a business unit or other department within an organization. The group may be requesting the review for new source code that performs an operation not previously executed or for a modification of existing source code. The automated review method 400 may determine a file name and a location of each of the configuration source code files.

Referring to steps 402 and 403, the configuration source code files are checked for information about the Spring namespace. A namespace, in general, provides rules, standards, and/or definitions for naming objects in a hierarchy. The Spring namespace provides rules, standards, and/or definitions for naming objects in the Spring framework. There may be multiple versions of the Spring namespace. In order to ensure compatibility with the system hosting the data store 16, it may be beneficial for the source code written to access the data store 16 to include a specific version of the Spring namespace. The pom.xml file 32, among other configuration source code files, may include information about the project or package of files, such as the namespace type and version, that will access the data store 16. The automated review method 400 may parse the pom.xml file 32 to determine the version of the Spring namespace that is implemented with the project. If the version of the Spring namespace is not greater than a namespace threshold value, then the issue flag may be set and the version of the Spring namespace may be recorded.

Referring to steps 404 and 405, the configuration source code files are checked for a version number of a data store access driver, such as a PostgreSQL™ driver. The PostgreSQL™ driver is software that enables a Java™ component or application to interact with the data store 16. In some situations, the PostgreSQL™ driver may also be considered a JDBC driver. There may be multiple versions of the PostgreSQL™ driver. In order to ensure compatibility with the system hosting the data store 16, it may be beneficial for the source code written to access the data store 16 to include a specific version of the PostgreSQL™ driver. The pom.xml file 32, among other configuration source code files, may include information about the project or package of files, such as the PostgreSQL™ driver version, that will access the data store 16. The automated review method 400 may parse the pom.xml file 32 to determine the version of the PostgreSQL™ driver that is implemented with the project. If the version of the PostgreSQL™ driver is not present or is not greater than a driver threshold value, then the issue flag may be set and the version of the PostgreSQL™ driver may be recorded.

Referring to steps 406 and 407, the configuration source code files are checked for a type of the data store access driver, such as the PostgreSQL™ driver. There may be multiple types of the PostgreSQL™ driver. In order to ensure compatibility with the system hosting the data store 16, it may be beneficial for the source code written to access the data store 16 to include a specific type of the PostgreSQL™ driver. The pom.xml file 32, among other configuration source code files, may include information about the project or package of files, such as the PostgreSQL™ driver type, that will access the data store 16. The automated review method 400 may parse the pom.xml file 32 to determine the type of the PostgreSQL™ driver that is implemented with the project. If the type of the PostgreSQL™ driver is not equal to a predetermined driver type, such as JDBC4, then the issue flag may be set and the type of the PostgreSQL™ driver may be recorded.

Referring to steps 408 and 409, the configuration source code files are checked for a "database" bean. In general, a bean is a definition in Java™ of an object, wherein the definition includes a simple assignment of a value to an object or variable. Typically, the bean does not include any calculations to be performed or logic to be considered. The bean for the database, or data store 16, includes a location, such as a URL, IP address, filename, or the like, of the data store 16. The automated review method 400 may parse configuration files, such as the XML files entitled "applicationContext*", to determine if the bean for "database" includes the proper address or filename for the data store 16. If the "database" bean does not include the proper address, then the issue flag may be set and the address of the "database" bean may be recorded.

Referring to steps 410 and 411, the DAO source code files are checked for a stereotype of each data access object class definition, such as a Java™ class definition. The stereotype may define certain properties for a particular aspect of the data store 16 access code. Generally, it is desirable to denote that the DAO source code provides access to a repository—that is, the data store 16. The automated review method 400 may parse the DAO source code files to search for Java™ class definitions. If the DAO source code files do not include the term "@Repository" before each Java™ class definition, then the issue flag is set and the Java™ class definition lacking "@Repository" is recorded.

Referring to steps 412 and 413, the configuration source code files are checked for definitions of templates belonging to a database connectivity framework, such as a "JDBCTemplate" and a "NamedParameterJdbcTemplate" bean. The templates, "JDBCTemplate" and "NamedParameterJdbcTemplate", include the JDBC framework Java™ code for various functions and operations. Thus, the behavior of the functions in these templates is known. If the beans for these templates are not present or they point to an improper address, then the deployables may not function as expected. The automated review method 400 may parse configuration files, such as the XML files entitled "applicationContext*", to determine if the beans for "JDBCTemplate" and "NamedParameterJdbcTemplate" are present and include the proper address or filename for the templates. If the beans are not present or do not include the proper addresses, then the issue flag may be set and the terms "JDBCTemplate" and "NamedParameterJdbcTemplate" may be recorded.

Referring to steps 414 and 415, the DAO source code files are checked for the "JDBCTemplate" and the "NamedParameterJdbcTemplate" to be autowired within each data access object class definition, such as a Java™ class definition. Typically, one or more Java™ methods in the Java™ class call functions from one or both of the templates. It is possible that the "JDBCTemplate" and/or the "NamedParameterJdbcTemplate" could be defined by the Java™ coder within the Java™ classes. This definition from the Java™ coder could be different from the one included with the JDBC framework. In order to avoid unexpected behavior of the "JDBCTemplate" and the "NamedParameterJdbcTemplate" functions, the two templates should be autowired in the Java™ class definition. Autowiring indicates that the "JDBCTemplate" and the "NamedParameterJdbcTemplate" pointed to by the Java™ beans in the configuration files, discussed in the previous step, are utilized. Autowiring may be achieved by including the term "@Autowired" before the definition of each template. The automated review method 400 may parse the DAO source code files to search for definitions of the "JDBCTemplate" and/or the "NamedParameterJdbcTemplate" within each Java™ class definition. If the term "@Autowired" is not present before the definition of each template, then the issue flag is set and the name of the Java™ class definition may be recorded.

After step 415, the status of the issue flag may be reviewed. If it is not set, then a proceed signal may be generated and the source code files may be deployed. If the issue flag is set, a halt signal may be generated.

Figure 11A:
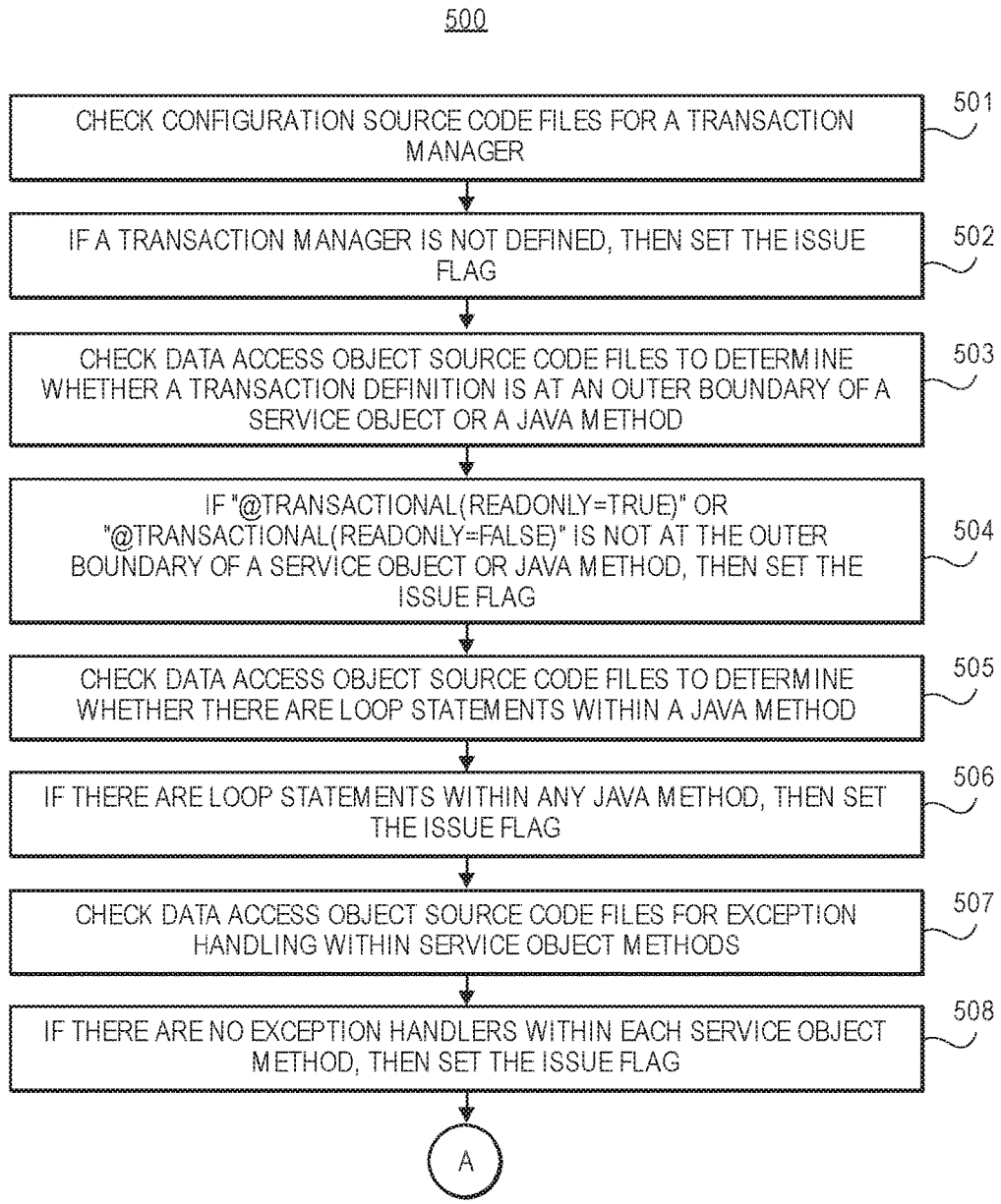
FIGS. 11A and 11B depict a listing of at least a portion of the steps of a computer-implemented automated review method for source code files for transaction and datasource configuration to access a data store.
Figure 11B:
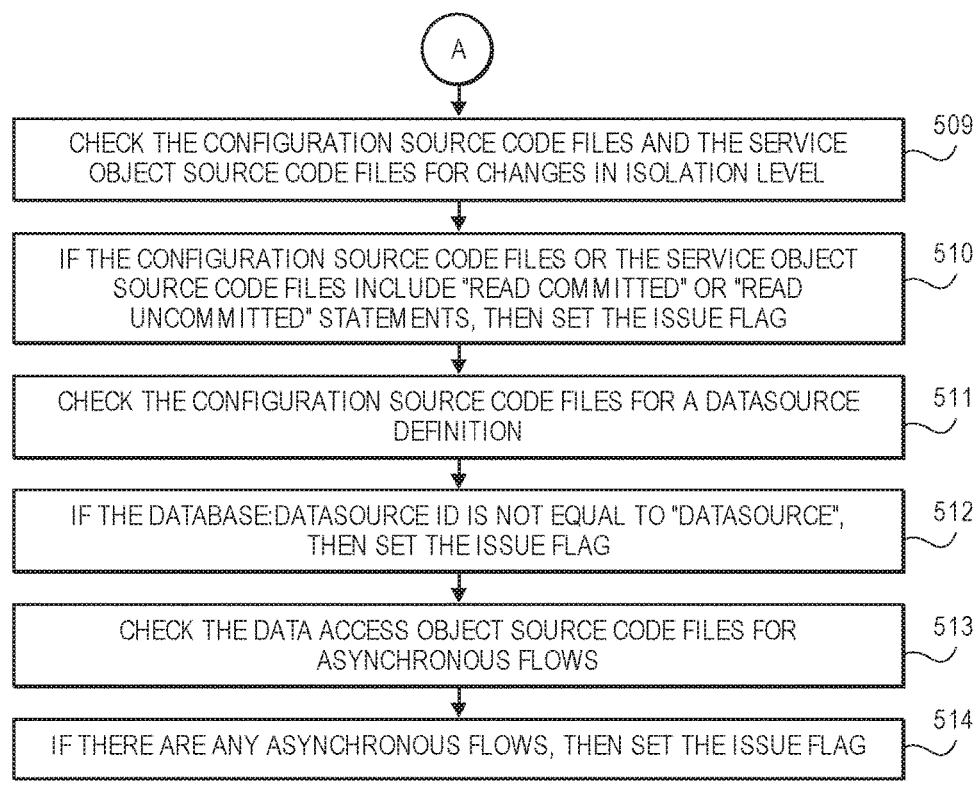

Referring now to FIGS. 11A and 11B, a listing of at least a portion of the steps of an exemplary computer-implemented automated review method 500 for source code files for transaction and datasource configuration to access a data store is depicted. The steps may be performed in the order shown in FIGS. 11A and 11B, or they may be performed in a different order. Furthermore, some steps may be performed concurrently as opposed to sequentially. In addition, some steps may be optional or may not be performed.

Referring to steps 501 and 502, the configuration source code files are checked for a transaction manager bean. The configuration source code files may be the same or similar ones as the configuration source code files discussed in the automated review method 400. As discussed above, operations which modify the data store 16, such as by adding, changing, or deleting data, are "transactions". And, in order to ensure data integrity, either all of the steps of a transaction are performed or none of the steps are performed, in case an error occurs before the transaction is complete. The transaction manager, such as the transaction manager in the Spring framework, may include code that properly handle all of the steps necessary to complete the transaction or roll back the transaction. The Spring framework transaction manager may be defined as a bean in the configuration source code files. The automated review method 500 may parse configuration files, such as the XML files entitled "applicationContext*", to determine if the bean for the transaction manager is present and includes the proper address or filename. If the bean is not present or does not include the proper address, then the issue flag is set and the term "transaction manager" may be recorded. The automated review method 500 may determine and check configuration source code files as part of a request that is received to automatically review the entire package of source code files seeking to access the data store 16 or a request to review just the configuration source code files. The request may come from a group of coders or programmers in a business unit or other department within an organization. The group may be requesting the review for new source code that performs an operation not previously executed or for a modification of existing source code. The automated review method 500 may determine a file name and a location of each of the configuration source code files.

Referring to steps 503 and 504, the DAO source code files are checked to determine whether a transaction definition is at an outer boundary of a service object or a method. The service object may be the highest level class of the data store access source code that gets called by an external application. Often, the data store access source code may include a plurality of service objects. At least a portion of the service objects may perform transaction functions. Furthermore, at least a portion of the methods within the service object class may perform transaction functions. Any service object class or method that performs transaction functions should have the transaction definition, indicated by the term "@Transactional (readOnly=True)" or "@Transactional (readOnly=False)", appear above the start of the class or method definition. The automated review method 500 may parse the DAO source code files to search for service object class and method definitions. If the transaction definition does not appear before the start of the service object class or method definition, then the issue flag is set and the name of the service object class or method may be recorded.

Referring to steps 505 and 506, the DAO source code files are checked for loops within a service object method. Loops may be any structures that repeat one or more commands, such as "for" loops, "do while" loops, "do until" loops, and so forth. Loops within a service object method may create unpredictable operation during deployment of the data store access source code. The automated review method 500 may parse the DAO source code files to search for service object method definitions. If the method definition includes any loop structures, then the issue flag is set and the name of the service object method may be recorded.

Referring to steps 507 and 508, the DAO source code files are checked for exception handling within data access object methods, such as Java™ methods, that change the contents of the data store 16. The methods that change the contents of the data store 16 would be service object, transactional methods. In order to roll back the operations of the transaction in case of an error occurring, the method needs an exception handler. The exception handler typically is cited in the first line of the method definition and includes the syntax term "throws" followed by the name of the exception handler. The automated review method 500 may parse the DAO source code files to search for service object method definitions. If the method definition does not include an exception handler, then the issue flag is set and the name of the service object method may be recorded.

Referring to steps 509 and 510, the DAO source code files and the configuration source code files are checked for changes in isolation level. The isolation level may determine whether one deployable is able to read original data or new data from the data store 16 while another deployable is trying to change the data. The change in isolation level may be implemented with "read committed" or "read uncommitted" statements. "Read committed" allows the deployable to read the data that has been committed, or is permanent, in the data store 16. "Read uncommitted" allows the deployable to read data that is not yet committed or permanent in the data store 16. Changing the isolation level may result in unexpected behavior from the deployables. The "read committed" or "read uncommitted" statements may be included in the DAO source code files or the configuration source code files. The automated review method 500 may parse the DAO source code files and the configuration source code files to search for statements that change the isolation level. If the DAO source code files or the configuration source code files include the terms "read committed" or "read uncommitted", then the issue flag is set and the name of the DAO source code file or the configuration source code file is recorded.

Referring to steps 511 and 512, the configuration source code files are checked for a datasource definition. The datasource may be used to instantiate a connection to the data store 16 and may be listed as a bean in one of the "applicationContext*" files. In an exemplary embodiment, the bean may include the following: database:datasource id="dataSource". Furthermore, the bean may include a location or filename for the datasource. The automated review method 500 may parse configuration files, such as the XML files entitled "applicationContext*", to determine if the bean for the datasource is present and includes the proper address or filename. If the bean is not present or does not include the proper address, then the issue flag is set and the term "datasource" may be recorded.

Referring to steps 513 and 514, the DAO source code files are checked for asynchronous flows within a service object method. Often, the flow within a method is synchronous. The method may call other methods or functions, but typically waits for the return of the method or function before executing other commands in a sequential fashion. The asynchronous flows, such as mule flows, may allow multiple operations to occur simultaneously. The automated review method 500 may parse the DAO source code files to search for service object method definitions. If the method definition includes any asynchronous method or functions calls, then the issue flag is set and the name of the service object method may be recorded.

After step 514, the status of the issue flag may be reviewed. If it is not set, then a proceed signal may be generated and the source code files may be deployed. If the issue flag is set, a halt signal may be generated.

Although the invention has been described with reference to the embodiments illustrated in the attached drawing figures, it is noted that equivalents may be employed and substitutions made herein without departing from the scope of the invention as recited in the claims.

Having thus described various embodiments of the invention, What is claimed as new and desired to be protected by Letters Patent includes the following:

1. A computer-implemented automated review method for data access object (DAO) source code files seeking to access a data store, the method comprising the steps of, wherein each step is performed by a processor of a computer:
   receiving a request to review DAO source code files seeking to access the data store;
   checking, using the processor of the computer, the DAO source code files for a database connectivity framework usage;
   setting an issue flag if the DAO source code files do not include any database connectivity framework usage;
   checking, using the processor of the computer, the DAO source code files for a configuration of structured query language (SQL) components and automatically reviewing the DAO source code files for class definitions and instances of SQL components within the class definitions;
   setting the issue flag if the SQL components are not of type "SQL";
   checking, using the processor of the computer, the DAO source code files for an injection of inputs into the SQL components;
   setting the issue flag if each input into the SQL components is not typed as a structured object or a single value;
   checking, using the processor of the computer, the DAO source code files for a type of data that is an input from the DAO source code into the SQL components;
   setting the issue flag if the data type of the input from the DAO source code does not match a required data type for the SQL components;
   checking, using the processor of the computer, the DAO source code files data returned from the SQL components;
   setting the issue flag if the data received from the SQL component is not typed as a structured object or a single value;
   reviewing the status of the issue flag;
   issuing a halt signal if the issue flag is set; and
   issuing a proceed signal if the issue flag is not set.

2. The computer-implemented automated review method of claim 1, further comprising the steps of:
   checking, using the processor of the computer, the DAO source code files for class level fields; and
   setting the issue flag if any of the fields within any class are not defined as "private".

3. The computer-implemented automated review method of claim 1, further comprising the steps of:
   checking, using the processor of the computer, the DAO source code files for methods that are defined as "private"; and
   setting the issue flag if any "private" method includes any loops that attempt to communicate outside of the method.

4. The computer-implemented automated review method of claim 3, further comprising the step of setting the issue flag if any "private" method includes any calls to other methods.

5. The computer-implemented automated review method of claim 1, further comprising the steps of:

checking, using the processor of the computer, the DAO source code files for SQL invocations within a method; and setting the issue flag if more than one SQL component is invoked per method.

6. The computer-implemented automated review method of claim 1, wherein checking the DAO source code files for database connectivity framework usage further comprises the steps of:

examining import statements in each DAO source code file, and setting the issue flag if the import statements do not include at least one instance of "org.springframework.jdbc".

7. The computer-implemented automated review method of claim 1, wherein checking the DAO source code files for database connectivity framework usage further comprises the steps of:

checking, using the processor of the computer, the DAO source code files for class and object definitions, and setting the issue flag if each class definition does not include "namedParamJDBCTemplate" as an object.

8. A computer-implemented automated review method for data access object (DAO) source code files seeking to access a data store, the method comprising the steps of, wherein each step is performed by a processor of a computer:

receiving a request to review DAO source code files seeking to access the data store;

checking, using the processor of the computer, the DAO source code files for class level fields;

setting an issue flag if any of the fields within any class are not defined as "private";

checking, using the processor of the computer, the DAO source code files for methods that are defined as "private";

setting the issue flag if any "private" method includes any loops that attempt to communicate outside of the method;

checking, using the processor of the computer, the DAO source code files for a database connectivity framework usage;

setting an issue flag if the DAO source code files do not include any database connectivity framework usage;

checking, using the processor of the computer, the DAO source code files for a configuration of structured query language (SQL) components and automatically reviewing the DAO source code files for class definitions and instances of SQL components within the class definitions;

setting the issue flag if the SQL components are not of type "SQL";

checking, using the processor of the computer, the DAO source code files for an injection of inputs into the SQL components;

setting the issue flag if each input into the SQL components is not typed as a structured object or a single value;

checking, using the processor of the computer, the DAO source code files for a type of data that is an input from the DAO source code into the SQL components;

setting the issue flag if the data type of the input from the DAO source code does not match a required data type for the SQL components;

checking, using the processor of the computer, the DAO source code files data returned from the SQL components;

setting the issue flag if the data received from the SQL component is not typed as a structured object or a single value;

reviewing the status of the issue flag;

issuing a halt signal if the issue flag is set; and issuing a proceed signal if the issue flag is not set.

9. The computer-implemented automated review method of claim 8, further comprising the step of setting the issue flag if any "private" method includes any calls to other methods.

10. The computer-implemented automated review method of claim 8, further comprising the steps of:

checking, using the processor of the computer, the DAO source code files for SQL invocations within a method; and setting the issue flag if more than one SQL component is invoked per method.

11. The computer-implemented automated review method of claim 8, wherein checking the DAO source code files for database connectivity framework usage further comprises the steps of:

examining import statements in each DAO source code file, and setting the issue flag if the import statements do not include at least one instance of "org.springframework.jdbc".

12. The computer-implemented automated review method of claim 8, wherein checking the DAO source code files for database connectivity framework usage further comprises the steps of:

checking, using the processor of the computer, the DAO source code files for class and object definitions, and setting the issue flag if each class definition does not include "namedParamJDBCTemplate" as an object.

13. A computer-implemented automated review method for data access object (DAO) source code files seeking to access a data store, the method comprising the steps of, wherein each step is performed by a processor of a computer:

receiving a request to review DAO source code files seeking to access the data store;

checking, using the processor of the computer, the DAO source code files for class level fields;

setting an issue flag if any of the fields within any class are not defined as "private";

checking, using the processor of the computer, the DAO source code files for methods that are defined as "private";

setting the issue flag if any "private" method includes any loops that attempt to communicate outside of the method or any calls to other methods;

checking, using the processor of the computer, the DAO source code files for a database connectivity framework usage;

setting an issue flag if the DAO source code files do not include any database connectivity framework usage;

checking, using the processor of the computer, the DAO source code files for a configuration of structured query language (SQL) components and automatically reviewing the DAO source code files for class definitions and instances of SQL components within the class definitions;

setting the issue flag if the SQL components are not of type "SQL";

checking, using the processor of the computer, the DAO source code files for an injection of inputs into the SQL components;

setting the issue flag if each input into the SQL components is not typed as a structured object or a single value;

checking, using the processor of the computer, the DAO source code files for a type of data that is an input from the DAO source code into the SQL components;

setting the issue flag if the data type of the input from the DAO source code does not match a required data type for the SQL components;

checking, using the processor of the computer, the DAO source code files data returned from the SQL components;

setting the issue flag if the data received from the SQL component is not typed as a structured object or a single value;

checking, using the processor of the computer, the DAO source code files for SQL invocations within a method;

setting the issue flag if more than one SQL component is invoked per method;

reviewing the status of the issue flag;

issuing a halt signal if the issue flag is set; and issuing a proceed signal if the issue flag is not set.

14. The computer-implemented automated review method of claim 13, wherein checking the DAO source code files for database connectivity framework usage further comprises the steps of:

examining import statements in each DAO source code file, and setting the issue flag if the import statements do not include at least one instance of "org.springframework.jdbc".

15. The computer-implemented automated review method of claim 13, wherein checking the DAO source code files for database connectivity framework usage further comprises the steps of:

checking, using the processor of the computer, the DAO source code files for class and object definitions, and setting the issue flag if each class definition does not include "namedParamJDBCTemplate" as an object.

* * * * *